(12) United States Patent
Sasaki

(10) Patent No.: US 6,887,176 B2
(45) Date of Patent: May 3, 2005

(54) TORQUE TRANSMISSION MECHANISMS AND POWER TOOLS HAVING SUCH TORQUE TRANSMISSION MECHANISMS

(75) Inventor: Katsuhiko Sasaki, Anjo (JP)

(73) Assignee: Makita Corporation, Anjo (JP)

( * ) Notice: Subject to any disclaimer, the term of this patent is extended or adjusted under 35 U.S.C. 154(b) by 29 days.

(21) Appl. No.: 10/353,672

(22) Filed: Jan. 29, 2003

(65) Prior Publication Data

US 2003/0173178 A1 Sep. 18, 2003

(30) Foreign Application Priority Data

Jan. 29, 2002 (JP) ........................................ 2002-020458
Mar. 18, 2002 (JP) ........................................ 2002-074805

(51) Int. Cl.[7] .............................................. F16H 48/30
(52) U.S. Cl. ....................... 475/150; 475/153; 192/56.2
(58) Field of Search ............................. 192/48.92, 54.1, 192/56.2; 477/166; 173/178; 475/150, 153

(56) References Cited

U.S. PATENT DOCUMENTS

| | | | | |
|---|---|---|---|---|
| 3,370,680 A | * | 2/1968 | Bangerter et al. ......... | 192/56.2 |
| 3,803,952 A | | 4/1974 | Whale, Jr. ................ | 81/52.4 R |
| 3,956,905 A | * | 5/1976 | Thackston ............... | 173/178 X |
| 4,243,129 A | * | 1/1981 | Schoeps .................... | 192/56.2 |
| 4,328,871 A | | 5/1982 | Gluskin ....................... | 173/12 |
| 4,502,549 A | * | 3/1985 | Hornung et al. ............ | 173/183 |
| 4,875,528 A | * | 10/1989 | Thackston ................. | 173/178 |
| RE33,514 E | * | 1/1991 | Ciolli ....................... | 192/48.92 |
| 5,573,472 A | * | 11/1996 | Ciolli .................. | 192/48.92 X |
| 5,601,149 A | | 2/1997 | Kawasaki et al. ......... | 173/93.5 |

FOREIGN PATENT DOCUMENTS

| | | | |
|---|---|---|---|
| DE | 2617640 | * | 1/1977 |
| DE | 3210889 A1 | | 9/1983 |
| DE | 3500324 A1 | | 7/1985 |

* cited by examiner

Primary Examiner—Ha Ho
(74) Attorney, Agent, or Firm—Anthony A. Laurentano; Lahive & Cockfield, LLP

(57) ABSTRACT

A torque transmission mechanism includes a drive shaft (31; 51; 84) and a driven shaft (32; 52; 87). The drive shaft rotates about an axis. The driven shaft extends along substantially the same axis as the drive shaft. A torque accumulator (35; 53; 90) serves to accumulate a rotational torque of the drive shaft and to transmit the rotational torque to the driven shaft due to a frictional force. A controller (20, 21, 24; 54, 57, 60, 64, 71, 73; 81, 92, 95, 98, 104) serves to control the accumulation of the torque in the accumulator.

29 Claims, 9 Drawing Sheets

TORQUE TRANSMISSION MECHANISMS AND POWER TOOLS HAVING SUCH TORQUE TRANSMISSION MECHANISMS

This application claims priorities to Japanese patent application Ser. Nos. 2002-020458 and 2002-074805.

BACKGROUND OF THE INVENTION

1. Technical Field

This application invention relates to torque transmission mechanisms that may produce a relatively large rotational torque. In particular, the present invention relates to torque transmission mechanisms that may be suitably utilized to power tools in order to rotate a tool spindle with a large rotational torque for tightening fasteners, e.g., screws, bolts and nuts. The present invention also relates to power tools incorporating such torque transmission mechanisms.

2. Description of the Related Art

FIG. 10 shows a known impact screwdriver 150 that has a rotary impact mechanism 160. The impact screwdriver 150 also includes an electric motor 151, a planetary gear mechanism 152 and a spindle 159 that is rotatably driven by the electric motor 151 via the planetary gear mechanism 152. The planetary gear mechanism 153 includes a sun gear (pinion gear) 157 that is mounted on an output shaft 151a of the electric motor 151. The rotary impact mechanism 160 is disposed on the front side (right side as viewed in FIG. 10) of the spindle 159.

The rotary impact mechanism 160 includes an anvil 161 and a hammer 162. The anvil 161 can rotate about the same axis as the rotational axis of the spindle 159. The hammer 162 has a substantially cylindrical tubular configuration and is fitted on the spindle 159, so that the hammer 162 can rotate and axially move relative to the spindle 159. The anvil 161 is rotatably supported by an impact casing 154 via a bearing 155. The impact casing 154 is attached to the front end of a main casing 153. The front end of the anvil 161 extends forwardly of the impact casing 154 and a driver bit (not shown) may be attached to the extended front end of the anvil 161.

Steel balls 164 are interposed between the spindle 159 and the hammer 162. More specifically, the steel balls 164 engaged respective cam recesses 159a that are formed in the outer peripheral surface of the spindle 159. The steel balls 164 also engage respective guide recesses 162a formed in the inner peripheral wall of the hammer 162. Each of the cam recesses 159a has a substantially semi-circular configuration in a cross-sectional and has a substantially V-shaped configuration as view from a lateral direction. The branches of the V-shape of each cam recess 159a are inclined relative to the rotational axis of the spindle 159. Each of the guide recesses 162a also has a substantially V-shaped configuration as viewed in a lateral direction but is oriented opposite to the cam recesses 159a. Therefore, the hammer 162 rotates relative to the spindle 159, while the hammer 162 moves in forward and rearward directions (right and left directions as viewed in FIG. 10) along the longitudinal axis of the spindle 159.

A compression spring 163 biases the hammer 162 in the forward direction (axial direction of the spindle 159), so that the movement of the hammer 162 in the rearward direction is performed against the biasing force of the compression spring 163. A pair of impact projections 162a are formed on the front end surface of the hammer 162 and extend toward the anvil 161. A pair of impact arms 161a extend from the rear end of the anvil 161 in a radial direction and serve to cooperate with the impact projections 162a.

Because the hammer 162 rotates as the hammer 162 moves in the forward direction against the biasing force of the compression spring 163 as described above, the impact projections 162b of the hammer 162 may strike the impact arms 161a of the anvil 161. Therefore, the anvil 161 receives impacts in the rotational direction. As a result, the screws on be tighten by the driver bit that is mounted on the anvil 161.

When a load (tightening resistance) that exceeds a predetermined value is applied to the anvil 161 via the driver bit during the tightening operation, the hammer 162 rotates relative to the spindle 159 while the hammer 162 moves in the rearward direction, so that the impact projections 162b no longer strike the impact arms 161a. In other words, the hammer 162 is disengaged from the anvil 161 and the load is not applied to the hammer 162. Therefore, the hammer 162 rotates and moves in the forward direction by the biasing force of the compression spring 163. When the hammer 162 has rotated by an angle of about 180° after disengagement of the hammer 162 from the anvil 161, the impact projections 162b again strike the impact arms 161a, so that additional impacts are applied onto the anvil 161 in the rotational direction in order to further tighten the screws.

According to the known impact screwdriver 150, the impact projections 162b of the hammer 162 strike the impact arms 161a of the anvil 161 in the rotational direction in order to apply a large torque for tightening screws. Therefore, impact sounds are produced at each time when the impact projections 162b strike the impact arms 161a. Such impact sounds may cause a noise problem during the operation of the impact screwdriver 150.

SUMMARY OF THE INVENTION

It is, accordingly, one object of the present invention to teach improved torque transmission mechanisms and power tools having such torque transmission mechanisms.

According to one aspect of the present teachings, torque transmission mechanism may include a drive shaft and a driven shaft. The drive shaft may rotate about an axis. The driven shaft may extend along substantially the same axis as the drive shaft. A torque accumulator may accumulate a rotational torque of the drive shaft and may transmit the rotational torque to the drive shaft due to a frictional force. A controller may control the accumulation of the torque in the accumulator.

Because the accumulated torque may be transmitted to the driven shaft due to the frictional force, noisy impact sounds may not be produced or noisy impact sounds may be reduced when the torque is transmitted to the driven shaft. In addition, the drive shaft may be rotated by a large rotational torque due to the accumulation of the torque in the torque accumulator.

According to another aspect of the present teachings, the rotational torque of the drive shaft may be transmitted to the torque accumulator also due to the frictional force. Therefore, the impact sounds may be further reduced.

According to another aspect of the present teachings, the torque accumulator may accumulate the rotational torque in both directions (clockwise direction and counterclockwise direction) of the drive shaft. Therefore, the versatility of the torque transmission mechanisms may be improved.

According to another aspect of the present teachings, the controller may control the frictional force between the torque accumulator and the driven shaft. If the frictional force is small, the torque may no be transmitted to the drive shaft or only a small torque may be transmitted to the driven shaft. On the other hand, if the frictional force is large, the torque may be reliably transmitted to the driven shaft. Therefore, the controller can realize a transmission mode and a non-transmission mode of the rotational torque or the accumulated rotational torque.

According to another aspect of the present teachings, the controller may control the accumulation of the rotational torque in the torque accumulator in response to a load that is applied to the driven shaft, i.e., a resistance against rotation of the driven shaft. Preferably, the controller may release the accumulated torque such that the accumulated torque may not be transmitted to the driven shaft when the load or the resistance exceeds a set value. Preferably, the torque may again be accumulated in the torque accumulator after the accumulated torque has been released, so that the controlled torque may be repeatedly applied to the driven shaft.

According to another aspect of the present teachings, the controller may provide a first mode and a second mode. In the first mode, the rotational torque of the drive shaft may be accumulated in the torque accumulator and may then be transmitted to the driven shaft. In the second mode, the accumulated rotational torque may be not be transmitted to the driven shaft or no substantial rotational torque may be transmitted to the driven shaft. Therefore, the accumulated rotational torque may be transmitted to the driven shaft when the control mode is switched from the second mode to the first mode. As a result, the transmission of the accumulated torque may be performed when it is desired or required.

According to another aspect of the present teachings, the torque accumulator may include resilient member that has a resiliency in the rotational direction of the driven shaft. Therefore, the resilient member may accumulate the torque as the resilient member is resiliently deformed, e.g., compressed or twisted in the rotational direction.

According to another aspect of the present teachings, the resilient member may be a coil spring. The coil spring may have a first portion and a second portion that slidably contact the drive shaft and the driven shaft, respectively, via one of an inner peripheral surface and an outer peripheral surface of the coil spring. Preferably, the coil spring may be fitted on the drive shaft and the driven shaft to receive them therein, so that the coil spring contacts the drive shaft and the driven shaft via the inner peripheral surface.

Therefore, when the drive shaft rotates, the coil spring may be rotated at the first portion due to the frictional force, so that the second portion as well as the first portion of the coil spring may be resiliently twisted. As a result, the first portion of the coil spring may be tightened around the drive shaft. In other words, the diameter of the first portion may be decreased while the first portion is resiliently deformed. In addition, if the rotational direction of the drive shaft is the same as the winding direction (coiling direction) of the second portion of the coil spring around the drive shaft, the second portion also may be tightened around the drive shaft. As a result, the rotational torque of the drive shaft may be converted into the resilient deformation of the first and second portions of the coil spring.

According to another aspect of the present teachings, the coil spring may have a first end and a second end that is opposite to the first end. The first end may be coupled to the controller and the second end may be coupled to the driven shaft.

According to another aspect of the present teachings, the controller may have a control member and an actuator for rotating the control member. The control member may be coupled to the coil spring. The controller may serve to rotate the second end in the opposite direction to the rotational direction of the drive shaft, so that the tightening force of the second portion of the coil spring around the drive shaft as well as the tightening force of the first portion of the coil spring around the drive shaft may be released. Therefore, the rotational torque of the drive shaft may not be transmitted to the drive shaft.

According to another aspect of the present teachings, the actuator may be driven by a power unit, e.g., an electric motor, a hydraulic motor and a pneumatic motor, that also drives the drive shaft. Therefore a separate drive unit may not be required for the actuator.

According to another aspect of the present teachings, the actuator may include a planetary gear mechanism. The planetary gear mechanism may have a sun gear, a plurality of planetary gears engaging the sun gear, an internal gear engaging and enclosing the planetary gears, and a carrier rotatably supporting the planetary gears. The controller may include a coupling device that couples the internal gear to the control member with regard to rotation. Therefore, the rotation of the internal gear may be transmitted to the control member in order to rotate the control member for releasing the tightening state of the coil spring.

According to another aspect of the present teachings, the controller may include a brake device that serves to apply a braking force to the internal gear of the actuator and to allow rotation of the internal gear when a predetermined rotational torque (force) is applied to the internal gear. The coupling device may be selectively operable to connect the internal gate to the control member and to disconnect the internal gear from the control member with regard to rotation.

According to another aspect of the present teachings, the coupling device may be operable to prevent and permit the rotation of the control member relative to the internal gear in response to the transmission torque between the control member and the internal gear.

According to another aspect of the present teachings, the controller may include a switching device that is operable to be switched between a torque accumulation mode and a torque releasing mode. In the torque accumulation mode, the rotational torque of the drive shaft may be accumulated in the torque accumulator but may not be transmitted to the driven shaft. In the torque releasing mode, the accumulated torque in the torque accumulator may be released to rotate the driven shaft. Preferably, the switching the device may prevent and permit the rotation of the control member in the torque accumulation mode and the torque releasing mode, respectively.

According to another aspect of the present teachings, in case of the design, in which the coil spring is included in the accumulator for accumulating the rotational torque of the drive shaft in both first and second directions that are opposite to each other, the rotational torque in the first and second direction may be transmitted to the drive shaft via different transmission paths.

Preferably, a transmission device may provide the transmission path when the drive shaft rotates in the first direction. The transmission device may include a rotary member that is rotatable relative to the drive shaft around the same axis as the drive shaft. The rotary member may be coupled to the driven shaft via the control member. The coil spring may include a third portion that slidably contacts the rotary member. The third portion may be displaced from the first portion and the second portion, with which the drive shaft and the driven shaft slidably contact, respectively. The first portion may be positioned between the second portion and the third portion.

When the drive shaft rotates in the first direction, the third portion of the coil spring may be tightened around the rotary shaft to transmit the rotational torque to the driven shaft via the transmission device, while the second portion of the coil spring may not be tightened around the driven shaft. Therefore rotational torque of the drive shaft may be transmitted to the driven shaft via the rotary member.

When the drive shaft rotates in the second direction, the second portion of the coil spring may be tightened around the driven shaft to transmit the rotational torque to the driven shaft, while the third portion of the coil spring may not be tightened around the rotary member. Therefore, the rotational torque of the drive shaft may be directly transmitted to the driven shaft.

As a result, the rotational torque both in the first and second directions may be accumulated and transmitted to the driven shaft.

According to another aspect of the present teachings, power tools may be include the torque transmission devices as described above. The drive shaft of the torque transmission devices may be a spindle, on which a tool bit may be mounted for engaging fasteners, e.g., screw, bolts and nuts. Therefore, the power tools may not produce noisy impact sounds during the tightening operation of the fasteners.

According to another aspect of the present teachings, the power tools may include a motor, e.g., an electric motor, a hydraulic motor and a pneumatic motor. The power tools also include a housing that accommodates the motor, a handle adapted to be grasped by an operator, and a trigger operable by the operator for starting and stopping the motor. The trigger and the lever of the switching device of the controller for switching between the torque accumulation mode and the torque releasing mode may be disposed adjacent to each other, so that the operator can operate either the lever or the trigger while the operator grasps the handle. Therefore, the operability of the power tools having the switching device may be improved.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

Figure 1:
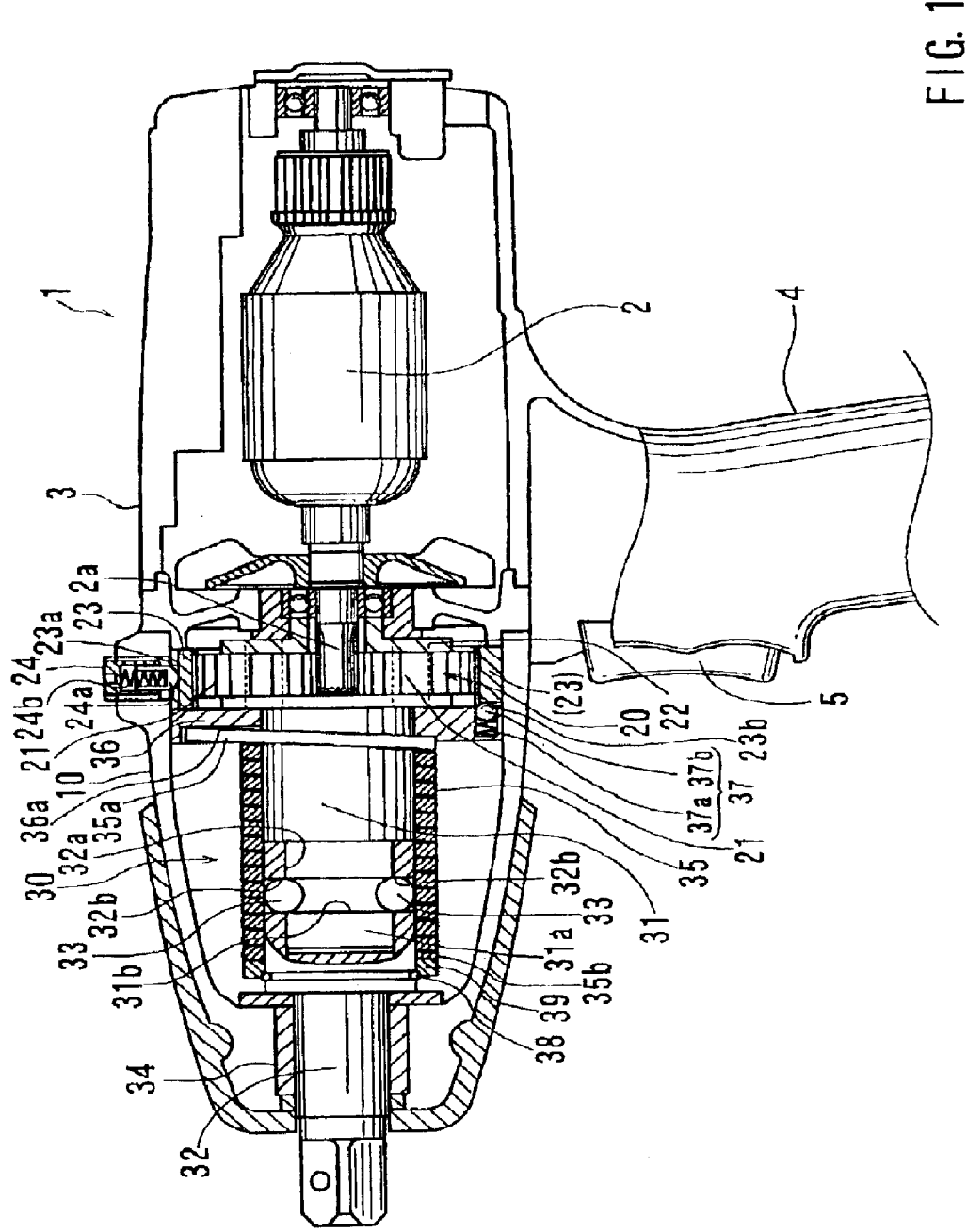
FIG. 1 is a side, cross-sectional view of a first representative fastener driving tool.

In one embodiment of the present invention, torque transmission devices may have a drive shaft, a coil spring and a driven shaft. The drive shaft may be rotatably driven by a drive unit, e.g. an electric motor, a hydraulic motor and a pneumatic motor. A first portion and a second portion of the coil spring may be frictionally fitted on the drive shaft and the driven shaft, respectively. When the drive shaft rotates in a winding direction, i.e., a coiling direction (right-hand direction in case of a left-handed coil spring), of the coil spring, the coil spring may be tightened around the drive shaft and may rotate together with the drive shaft. The rotational direction of the coil spring may be the winding direction of the second portion of the coil spring, so that the second portion also may be tightened around the drive shaft. As a result, the driven shaft may rotate as the drive shaft rotates.

A controller may be operable to rotate a third portion of the coil spring that is opposite to the second portion, so that the first and second portions of the coil spring may be loosened. As a result, the drive shaft may rotate idle relative to the coil spring. In other words, the rotation of the drive shaft may not be transmitted to the driven shaft.

As the drive shaft rotates idle, the rotational speed of the drive shaft may be increased because no substantial load is applied to the drive shaft. Therefore, an inertia torque (energy of rotation) of the drive shaft itself, and any other intervening mechanisms between the drive shaft and the drive unit may be increased.

When the controller permits the third portion to return to the original position, e.g., by the resiliency of the coil spring, the fist portion of the coil spring may be again tightened around the drive shaft that rotates with the increased inertia torque in addition to the rotational torque of the driven unit. Therefore, the drive shaft may be rotated with a large torque.

Because the transmission of torque from the drive shaft to the drive may be realized due to the frictional force between the coil spring and each of the drive shaft and the driven shaft, noisy impact sounds may not be produced.

In another embodiment of the present teachings, the controller may include a planetary gear mechanism. The planetary gear mechanism may have a sun gear, a plurality of planetary gears engaging the sun gear, an internal gear engaging and enclosing the planetary gears, and a carrier rotatably supporting the planetary gears. The drive shaft may be coupled to the carrier, so that the drive shaft rotates with the carrier. The sun gear may be mounted on an output shaft of the drive unit. A brake device may prevent the internal gear from rotation, so that the drive shaft as well as the carrier may rotate relative to the internal gear as the sun gear rotates.

When a load, e.g., a tightening resistance, applied to the drive shaft exceeds a predetermined value, the rotation of the drive shaft as well as the driven shaft may be stopped, so that a reaction force may be produced to rotate the internal gear in the direction opposite to the rotational direction of the drive shaft against the braking force applied by the brake device. Therefore, the third portion of the coil spring may rotate to loosen the first and second portions of the coil spring that have been tightened around the drive shaft and the driven shaft, respectively.

As soon as the coil spring is loosened (released from the tightened state), the reaction force may be no longer applied to the internal gear, so that the rotation of the internal gear may be stopped by the braking force applied by the brake device. Therefore, the drive shaft may start to rotate idle and the coil spring may then be tightened around the drive shaft and the driven shaft to transmit rotation to the driven shaft.

As a result, the releasing and tightening operations of the coil spring may be automatically repeated. In addition, the time when the internal gear starts to rotate may be controlled by adjusting the braking force of the brake device applied to the internal gear.

In another embodiment of the present teachings, a small rotational torque may always be transmitted to the driven shaft as long as the drive shaft rotates. In other words, as the drive shaft rotates idle, a small rotational torque may be transmitted to the driven shaft due to the frictional force between the coil spring and each of the drive shaft and the driven shaft. In such a case, the reaction force applied to the driven shaft may be absorbed by the relative rotation between the coil spring and each of the drive shaft and the driven shaft.

In another embodiment of the present teachings, the controller may include a control spring that may be frictionally fitted on a rotary control member and the internal gear. The control member may be coupled to the end portion of the coil spring, so that the tightened coil spring may be loosened as the control member rotates in the opposite direction to the rotational direction of the drive shaft. Preferably, the control spring may be a coil spring that has a winding direction (coiling direction) opposite to the winding direction of the coil spring that is fitted on the drive shaft and the driven shaft.

As the internal gear rotates, the control spring may be tightened around the internal gear and also around the control member, so that the rotation of the control member may be transmitted to the coil spring. When the rotation of the internal gear is stopped, the control spring may be loosened, so that the coil spring also may be loosened. At the same time, the drive shaft may start to rotate again, so that the coil spring may be tightened around the drive shaft and the driven shaft.

In another embodiment of the present teachings, the controller may have a switching device that is operable by an operator in order to selectively prevent and permit the tightening of the coil spring around the drive shaft and the driven shaft.

When the coil spring is prevented from being tightened, the rotation of the drive shaft may not be transmitted to the driven shaft. In other words, the drive shaft may be maintained in the state of idle rotation as long as the switching device is operated to permit the tightening of the coil spring.

Therefore, the operator can selectively start and stop the transmission of torque to the drive shaft by the operation of the switching device. Therefore, the versatility of the power transmission mechanisms may be improved.

Preferably, the switching device may be a lock device that is operable to lock and unlock the rotational position of the end portion of the coil spring. The lock device may be coupled to a lever that can be operated by the operator. Preferably, the lever may be disposed adjacent a trigger that is operable to start and stop the motor. With this arrangement, the operator can easily operate the lever after or before the operation of the trigger.

In another embodiment of the present teachings, torque transmission mechanisms may include a drive shaft that can be rotated in both first and second directions opposite to each other by a drive unit, e.g. an electric motor, a hydraulic motor and a pneumatic motor. A driven shaft and a rotary member may extend along the same axis as the drive shaft and may be disposed opposite to each other with respect to the drive shaft. A coil spring may be fitted on and extend over the drive shaft, driven shaft and the rotary member. An intermediate member may serve to transmit the rotation of the rotary member to the driven shaft.

When the drive shaft rotates in the first direction, the coil spring may be tightened around the drive shaft and also around the driven shaft, so that the driven shaft rotates in the first direction in unison with the drive shaft. When the drive shaft rotates in the second direction, the coil spring may be tightened around the drive shaft and also around the rotary member, so that the rotary member rotates in unison with the drive shaft. The rotation of the rotary member may then be transmitted to the driven shaft via the intermediate member. During the rotation of the driven shaft in the first direction and/or the second direction, one end of the coil spring may be rotated in a loosening direction that is opposite to a winding direction (coiling direction), so that the coil spring may be loosened. As a result, the drive shaft may rotate idle. When the one end of the coil spring returns in the winding direction after that, the coil spring may be tightened again around the drive shaft and the driven shaft. Therefore, an inertia torque produced by the idle rotation of the drive shaft may be added to the output torque of the power unit in order to rotate the driven shaft. This arrangement of the torque transmission deices may be advantageous, in particular when the torque transmission devices are applied to fastener tightening tools for tightening and releasing fasteners, a e.g., screws, bolts and nuts.

Thus, when the drive unit, e.g. an electric motor rotates in the first direction or the second direction, a large torque may be instantaneously outputted in order to tighten or release the fasteners. For example, if the coil spring is a left-hand coil spring, the rotation of the drive unit in a right-hand direction may be transmitted to the driven shaft via a right-hand transmission path (driven shaft—coil spring—driven shaft), so that the driven shaft rotates in the right-hand direction in order to tighten the fasteners. On the other hand, the rotation of the drive unit in a left-hand direction may be transmitted to the driven shaft via a left-hand transmission path (drive shaft—coil spring—rotary member—intermediate shaft—driven shaft), so that the driven shaft rotates in the left-hand direction in order to loosen the fasteners.

Preferably, the drive shaft may have a large diameter portion. The drive shaft may be disposed on one side in the axial direction of the large diameter portion. The rotary member may be disposed on the other side of the large diameter portion and may be rotatably supported on the drive shaft. The large diameter portion of the drive shaft, the driven shaft and the rotary member may have the same outer diameter with each other, so that the coil spring may be fitted on and extend over the large diameter portion, the driven shaft and the rotary member.

With this arrangement, if the coil spring is a left-hand spring and the drive unit rotates in the right-hand direction, the coil spring may be twisted due to the frictional force between the drive shaft and the coil spring, so that the coil spring may be tightened around the drive shaft and may rotate in the right-hand direction in unison with the drive shaft. Because the right-hand rotation of the coil spring may be a winding direction (coiling) of the coil spring around the driven shaft, the coil spring also may be tightened around the driven shaft, so that the driven shaft may rotate in the right-hand direction in unison with the drive shaft. Because the right-hand rotation of the coil spring may be a loosening direction of the coil spring around the rotary member, the coil spring may not be tightened around the rotary member. Therefore, the driven shaft may rotate in the right-hand direction and the rotary member may also rotate in the right-hand direction due to transmission of rotation from the driven shaft to the rotary member via the intermediate shaft.

On the other hand, when the drive unit rotates in the left-hand direction, the coil spring also may be twisted due to the frictional force between the drive shaft and the coil spring, so that the coil spring may be tightened around the drive shaft and may rotate in the left-hand direction in unison with the drive shaft. Because of the positioning of the driven shaft and the rotary member on the opposite sides with respect to the drive shaft (large diameter portion), irrespective of the rotational direction of the drive shaft, the coil spring may always be tightened around the drive shaft as the drive shaft rotates.

Because the left-hand rotation of the coil spring may be a winding direction (coiling direction) of the coil spring around the rotary member, the coil spring also may be tightened around the rotary shaft, so that the rotary shaft may rotate in the left-hand direction in unison with the drive shaft. On the other hand, because the left-hand rotation of the coil spring may be a loosening direction of the coil spring around the driven shaft, the coil spring may not be tightened around the driven shaft. Therefore, the rotation of the drive shaft may be transmitted to the driven shaft only via the left-hand transmission path and no rotational torque of the drive shaft may be transmitted via the right-hand transmission path.

In either the right-hand rotation or the left-hand rotation of the drive shaft, the drive shaft may rotate idle when the one end of the coil spring is rotated in the loosening direction of the coil spring during the transmission of rotation from the drive shaft to the driven shaft. When the one end of the coil spring returns to rotate in the winding direction, the driven shaft may start to rotate with the inertia torque in addition to the output torque of the drive unit. Therefore, the fasteners can be tightened by a large torque and can be easily loosened when the torque transmission mechanisms are adapted to fastener driving tools.

In another embodiment of the present teachings, a controller may be operable by an operator to prevent the coil spring from being tightened around the drive shaft. Therefore, the timing of outputting the torque (the sum of the inertia torque and the output torque of the drive unit) may be controlled as desired by the operator. Preferably, the controller may have a lever that is disposed adjacent a trigger of the drive unit.

In another embodiment of the present teachings, power tools, e.g. faster driving tools, are taught that may have the power transmission devices as described above. Therefore, the power tools may operate to apply a large torque without producing noisy impact sounds.

Each of the additional features and teachings disclosed above and below may be utilized separately or in conjunction with other features and teachings to provide improved torque transmission devices and power tools and methods for designing and using such torque transmission devices and power tools. Representative examples of the present invention, which examples utilize many of these additional features and teachings both separately and in conjunction, will now be described in detail with reference to the attached drawings. This detailed description is merely intended to each a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

First to fourth representative fastener driving tools will now be described with reference to FIGS. 1 to 9. These representative fastener driving tools may be designed to drive fasteners, e.g. screws, bolts and nuts, that have right-hand threads. The fasteners with right-hand threads may be tightened and loosened when they are rotated in a clockwise direction and a counterclockwise direction as viewed from the side of their heads, respectively.

Figure 5:
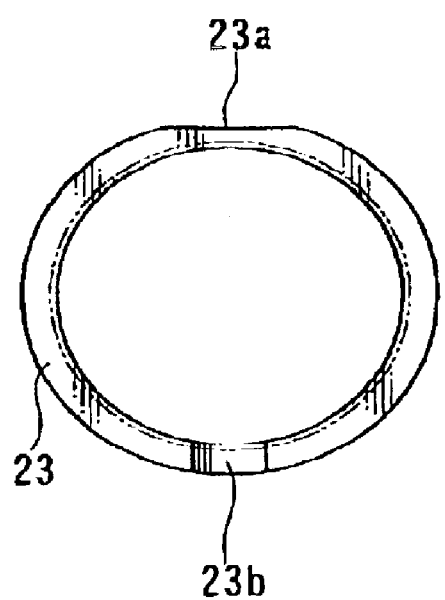
FIG. 5 is a front view of an internal gear of a planetary gear mechanism of the torque transmission mechanism.

Referring to FIG. 1, a first representative fastener driving tool 1 may have a main body 3 and a handle 4. The main body 3 may include a main housing 10 that has a substantially cylindrical tubular configuration. An electric motor 2 may be disposed within the main housing 10 and may serve as a drive unit. The handle 4 may extend downward from the main body 3. A trigger 5 may be mounted on the handle 4 in a position adjacent the main body 3. The motor 2 may start and stop when an operator pulls and release the trigger 5, respectively. The rotation of the motor 2 may be transmitted to a spindle 32 via a torque transmission mechanism that may include a fastener tightening mechanism 30 and a planetary gear mechanism 20. An output shaft 2a of the motor 2 may have a gear portion that serves as a sun gear of the planetary gear mechanism 20. Thus, the gear portion of the output shaft 2a may engage three planetary gears 21 of the planetary gear mechanism 20. The planetary gears 21 may be rotatably supported on a carrier 22 and may be spaced equally in the circumferential direction of the carrier 22. The planetary gears 21 may engage a substantially circular internal gear 23. The internal gear 23 may enclose the planetary gears 21 and may be rotatably supported within the main housing 10. A brake device 24 may be mounted on the housing 10 and may include a pressing member 24a and a compression spring 24b that serves to bias the pressing member 24a toward the outer circumferential surface of the internal gear 23. As shown in FIG. 5, the outer circumferential surface of the internal gear 23 may have a flattened portion 23a and the pressing member 24a may be pressed against the flattened portion 23a. Therefore, the pressing member 24a may serve to provide a resistance against the rotation of the internal gear 23 relative to the main housing 10.

A drive shaft 31 may be formed integrally with the carrier 22 and may extend from the front surface (left side surface as viewed in FIG. 1) of the carrier 22. Therefore, the drive shaft 31 can rotate together with the carrier 22. The rotational axis of the drive shaft 31 may coincide with the rotational axis of the carrier 22 as well as the rotational axis of the output shaft 2a of the electric motor 2.

The front portion of the drive shaft 31 may be configured as a boss portions 31a. The boss portion 31a may have a diameter that is smaller than the diameter of the remaining portion of the drive shaft 31. The boss portion 31a may be inserted into a support hole 32a that is formed in the spindle 32. The boss portion 31a can rotate relative to the spindle 32. However, there may be no substantial clearance between the boss portion 31a and the inner wall of the support hole 32a.

An annular recess 31b may be formed in the outer peripheral surface of the boss portion 31a and preferably may have a semicircular configuration in cross section. Two steel balls 33 may engage the annular recess 31b and may be received within respective retaining holes 32b formed in the spindle 32. Preferably, the retaining holes 32b may extend throughout the thickness of the spindle 32 and may oppose to each other in the diametrical direction. Each steel ball 33 may be received within the corresponding retaining hole 32b and may partly engage the annular recess 31b. Therefore, the spindle 32 may be coupled to the drive shaft 31 via the boss portion 31b such that the spindle 32 can rotate relative to the drive shaft 31 but cannot move relative to the drive shaft 31 in the axial direction. The steel balls 33 may be prevented from being removed from the retaining holes 32b by a coil spring 35 that is fitted on the spindle 32.

The front portion of the spindle 32 may be rotatably supported by the main housing 10 via a bearing 34. The front end of the spindle 32 may extend to the outside from the front end of the main housing 10 and may serve as a mount portion for a tool bit, e.g. a hexagonal socket and a driver bit for driving fasteners (not shown).

The coil spring 35 may be coiled in a left-hand direction and may extend over the drive shaft 31 and the spindle 32. More specifically, a right portion of the coil spring 35 as viewed in FIG. 1 may be fitted on the drive shaft 31 and a left portion of the coil spring 35 as viewed in FIG. 1 may be fitted on the spindle 32. Preferably, the coil spring 35 may be formed by a wire that has a substantially square or rectangular configuration in cross section. The rotation of the drive shaft 31 in a right-hand direction (clockwise direction as viewed from a right side in FIG. 1) may be transmitted to the output shaft 32 via the coil spring 32 as will be hereinafter explained. For example, in case that the outer diameter of the drive shaft 31 and the spindle 32 is about 30 mm, the coil spring 35 may have an inner diameter of about 29.50 mm when no load is applied. The coil spring may be made of a with that has a width (that may correspond to the thickness of the coil spring) of 2.45 mm and a height of 2.7 mm in cross section. Preferably, the material of the wire may be SWRS. The wire may be coiled to have 20 turns to form a coil spring. A substantially half portion of the coil spring having ten turns may be fitted on the drive shaft, and the remaining half portion of the coil spring having ten turns may be fitted on the driven shaft. Preferably, the coil spring may be designed to provide a maximum tightening torque of about 200 kg-cm.

Figure 2:
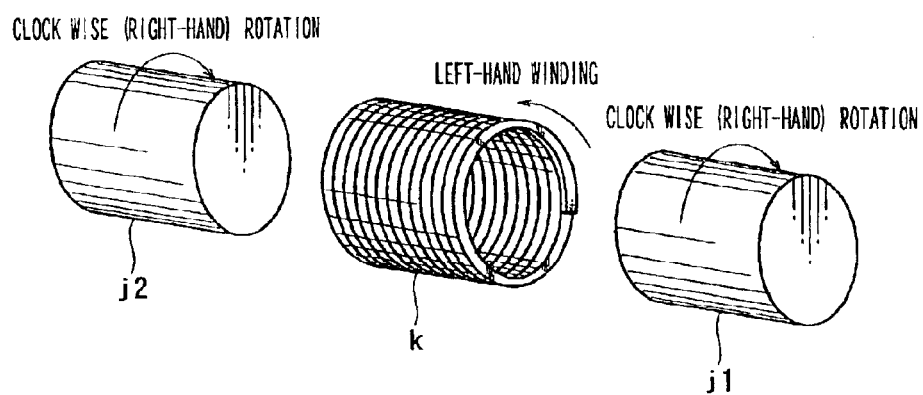
FIG. 2 is an exploded schematic perspective view of a torque transmission mechanism and illustrating the principle of transmission of torque via a coil spring.

The principle of transmission of rotation via the coil spring 32 will now be explained with reference to FIGS. 2 and 3, which schematically shows a torque transmission mechanism T that includes a left-hand coil spring k (that corresponds to the coil spring 35) in order to transmit rotation of a drive shaft j1 (that corresponds to the drive shaft 31) to a drive shaft j2 (that corresponds to the spindle 32).

Figure 3:
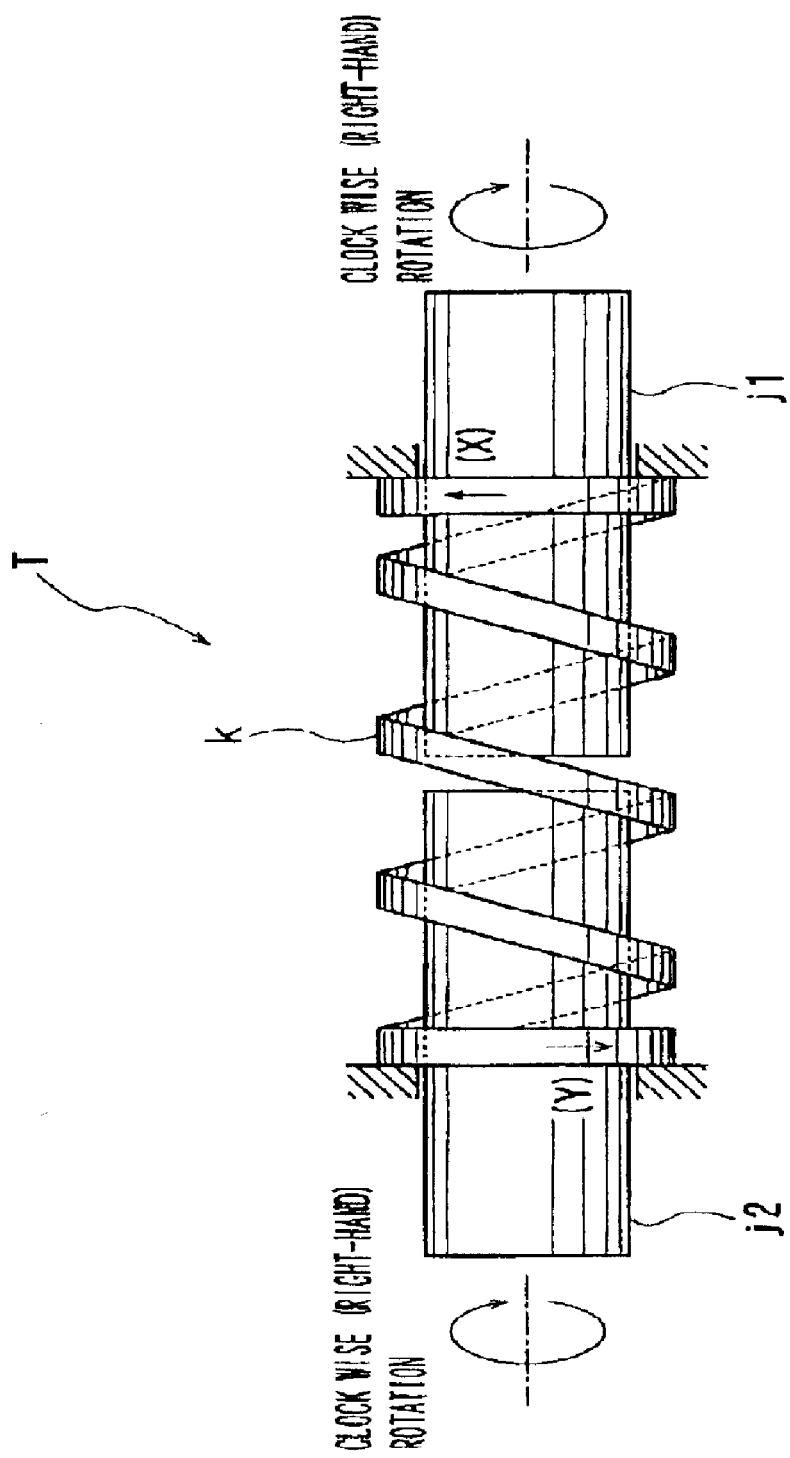
FIG. 3 is a schematic side view of the torque transmission device.

Referring to FIG. 3, the right portion of the coil spring k may be frictionally fitted on the drive shaft j1 and the left portion of the coil spring k may be frictionally fitted on the driven shaft j2. Therefore, the rotation of the drive shaft j1 in the right-hand direction may be transmitted to the output shaft j2 via the coil spring k. Here, the outer diameter of the drive shaft j1 and the outer diameter of the driven shaft j2 may be determined such that no substantial clearance is produced between the drive shaft j1 and the coil spring k and between the driven shaft j2 and the coil spring k, respectively. Practically, the outer diameter of each of the drive shaft j1 and the driven shaft j2 may be determined such that the drive shaft j1 and the coil spring k can be inserted into the coil spring k by a manual force of the operator against a relatively smaller resistance (a week press fitting force).

When the drive shaft j1 rotates the right-hand direction, the coil spring k may rotate in a winding direction (coiling direction) around the drive shaft j1 due to the frictional force. More specifically, the right portion of the coil spring k that contacts the drive shaft j1 may be force to move (rotate) in a direction as indicated by an arrow X. Therefore, the right portion of the coil spring k may be tightened around the drive shaft j1 so that, the frictional force between the right portion and the drive shaft j1 may be increased. As a result, the coil spring k may rotate in the right-hand direction together with the drive shaft j1.

Because the rotational direction of the coil spring k may be a winding direction (coiling direction) around the driven shaft j2, the left portion of the coil spring k that contacts the driven shaft j2 may be forced to move in a direction as indicated by an arrow Y. Therefore, the left portion of the coil spring k also may be tightened around the drive shaft j2 and the driven shaft j2 may rotate in the right-hand direction.

As described above, the torque transmission mechanism T may be configured to transmit rotation of the drive shaft j1 to the driven shaft j2 by utilizing the increase in the frictional force between coil spring k and each of the driven shaft j1 and the driven shaft j2. Therefore, it will be advantageous that the coil spring k has a large contact area with the drive shaft j1 and the driven shaft j2. For this reason, a wire that has a substantially square or rectangular configuration in cross section may be advantageously used to form the coil spring k. However, a wire that has a circular cross section or any other cross sectional configuration than a square or rectangular configuration also may be used to form the coil spring k.

The principle described above also may be applied to torque transmission mechanisms between drive shafts and respective driven shafts (spindles) of the second to fourth representative embodiments.

Figure 4:
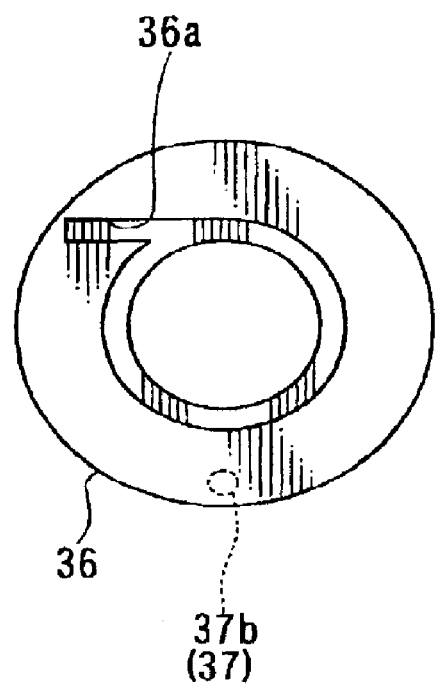
FIG. 4 is a front view of an actuation plate of the torque transmission device of the first representative fastener driving tool.

An annular actuation plate 36 may be rotatably supported on the drive shaft 31 in a position adjacent the front surface of the carrier 22. As shown in FIG. 4, an engaging recess 36a may be formed in the left side surface (as viewed in FIG. 1) of the actuation plate 36. A right end 35a and of the coil spring 35a may engage the engaging recess 36a of the actuation plate 36, so that the right end 35a may rotate about the axis of the drive shaft 31 as the actuation plate 36 rotates. More specifically, when the actuation plate 36 rotates in the clockwise direction as viewed in FIG. 4, the right end 35a rotates in a direction opposite to the winding direction (coiling direction) of the coil spring 35. On the other hand, when the actuation plate 36 rotates in the counterclockwise direction, the right end 35a may rotate in the winding direction (coiling direction) of the coil spring 35. In this way, in response to the direction of rotation of the actuation plate 36a, the coil spring 35 may be twisted on the side of the right end 35 in order to transmit rotation of the driven shaft 31 to the spindle 32 and to allow the drive shaft 31 to rotate idle.

A lock device 37 may be mounted on the actuation plate 37 and may include a compression spring 37a and a steel ball 37b. The steel ball 37b may be biased by the compression spring 37a in the right direction as viewed in FIG. 1 and may engage an engaging recess 23b (see FIG. 5) that is formed in the left side surface of the internal gear 23 as viewed to FIG. 1. Therefore, the rotation of the actuation plate 36 relative to the internal gear 23 may be restrained by the lock force of the lock device 37.

A left end 35b of the coil spring 35 may be pressed against a right side surface of an annular retainer plate 39 that is mounted on the spindle 32. The retainer plate 39 may be prevented from moving in the axial direction relative to the spindle 32 by a stopper ring 38 that is attached to the spindle 32. Therefore, the left end 35b of the coil spring 35 may not move in the axial direction but may rotate relative to the spindle 32.

The operation of the first representative fastener driving tool 1 will now be described. When the operator pulls the trigger 5, the motor 2 may start to rotate. The rotation of the motor 2 may be transmitted to the drive shaft 31 via the planetary gear mechanism 20, so that the drive shaft 31 rotates in the clockwise direction (right-hand direction) as viewed from the right side in FIG. 1. As the drive shaft 31 rotates in the clockwise direction, the right portion of the coil spring 35 may be forced to rotate in the winding direction (coiling direction), so that the coil spring 35 rotates together with the drive shaft 31. The actuation plate 36 also may rotate together with the coil spring 35. At this stage, the internal gear 23 of the planetary gear mechanism 20 is prevented form rotating relative to the main housing 10 due to the braking force applied by the brake device 24. On the other hand, the actuation plate 36 may rotate relative to the internal gear 23, because the rotational torque of the actuation plate 36 exceeds a set value that is determined by the locking force applied by the lock device 37. Preferably, the locking force of the lock device 37 may be smaller than the braking force applied by the brake device 24. Therefore, the steel ball 37b of the lock device 37 may retract against the biasing force of the compression spring 37b so as to be disengaged from the engaging recess 23b as the actuation plate 36 rotates relative to the internal gear 23.

Because the coil spring 35 may rotate in the clockwise direction that is the winding direction (coiling direction), the output shaft 32 also may rotate in the same direction due to the frictional force between the left portion of the coil spring 35 and the spindle 32. As the spindle 32 rotates, a tool bit (not shown) attached to the spindle 32 also rotates to tighten fasteners, e.g. screws, bolts and nuts. At this stage, the tightening torque applied to the fastener via the tool bit may be equal to an output torque TM of the electric motor 2.

As the fastener is tightened, the resistance against the tightening torque (tightening force) applied by the spindle 32 may increase. When the resistance exceeds the tightening torque, the spindle 32 may not rotate further, so that the rotation of the spindle 32 may be stopped. Then, the rotation of the drive shaft 31 as well as the coil spring 35 may be stopped. Therefore, the rotation of the carrier 22 that carries the planetary gears 21 may be stopped. Then, the rotation of the motor 2 may be converted into the rotational movement of the internal gear 23. In other words, the internal gear 23 may rotate when the rotational torque applied to the internal gear 23 exceeds the braking force applied by the brake device 24. Thus, the pressing member 24a of the brake device 24 may be retracted against the biasing force of the compression spring 24b so as to be disengaged from the flattened surface 23a as the internal gear 23 rotates.

In case that the internal gear 23 is prevented from moving relative to the main housing 10 by the brake device 24, the tightening resistance of the fastener against the rotational torque applied to the fastener via the spindle 32 may produce a reaction force that may force to rotate the main body 3 or the entire fastener driving tool 1. Therefore, the operator must hold the main body 3 and/or the handle 4, while he or she with stands such a reaction force. On the other hand, in case that the internal gear 23 is forced to rotate relative to the main housing 10 against the braking force applied by the brake device 24, no reaction force may be produced to rotate the main body 3 or the entire fastener driving tool 1. Therefore, in the latter case, the operator is not required to withstand the reaction force.

If the restriction force (braking force) applied by the brake device 24 is too large, the operator must withstand a large reaction force. In other words, the operator must bear an excessive load. For this reason, the restriction force (braking force) applied by the brake device 24, which restriction force may be determined by the biasing force of the compression spring 24b, may preferably be chosen such that the operator is not required to bear an excessive load.

As the output shaft 2a of the motor 2 rotates in the clockwise direction (right-hand direction), the internal gear 23 may rotate in the opposite direction or the counterclockwise direction (left-hand direction). The rotation of the internal gear 23 may be transmitted to the actuation plate 36 via the lock device 37, so that the actuation plate 36 rotates in the counterclockwise direction. Therefore, the right end 35a of the coil spring 35 moves (rotates) in the opposite direction to the winding direction (coiling direction) so as to release the tightening of the coil spring 35 around the drive shaft 31.

After the internal gear 23 has rotate by an angle of about 360°, the pressing member 24a of the brake device 24 may again engage the flattened portion 23a of the internal gear 23, so that the brake device 24 again applies a restriction force against rotation of the internal gear 23. In addition, once the rotation of the internal gear 23 is stopped, the right end 35a of the coil spring 35 and the actuation plate 36 may return to rotate in the opposite direction to the winding direction due to the resilient restoring force of the coil spring 35. Because the tightening (torsion in the winding direction) of the coil spring 35 is released at this time, the tightening resistance of the fastener may be no longer applied to the drive shaft 31 via the coil spring 35. Therefore, the drive shaft 31 may again rotates in the clockwise direction (right-hand direction) while the rotation of the internal gear 23 may be stopped by the brake device 24. More specifically, the drive shaft 31 rotates idle because no substantial resistance is applied to the drive shaft 31.

After the actuation plate 36 and the right end 35a of the coil spring 35 have recovered their original position due to the restoring force of the coil spring 35, the right end 35a of the coil spring 35 again rotates in the winding direction (coiling direction) due to the frictional force between the coil spring 35 and the drive shaft 31. Therefore, an inertia torque of the output shaft 2a of the motor 2, the planetary gear mechanism 20 (in particular the planetary gears 21 and the carrier 22) and the drive shaft 31 in addition to the output torque of the motor 2 may be transmitted to the driven shaft 32 via the coil spring 35. Thus, the fastener may be tightened by the torque that is the sum of the output torque of the motor 2 and the inertia torque. The sum of these torque may be greater than the initial tightening torque or the output torque of the motor 2. As a result, the fastener can be further tightened by a great force (torque).

When the tightening resistance applied by the fastener exceeds the tightening torque, the rotation of the spindle 32 may be stopped, and the drive shaft 31 may again rotate idle. Thereafter, the coil spring 5 may again rotate in the winding direction to apply the sum of the torque of the inertia torque and the output torque of the motor 2 to the fastener via the spindle 32.

As described above, according to the first representative fastener driving tool 1, at each time when the tightening resistance exceeds the tightening torque, the tightening (torsion in the coiling direction) of the coil spring 35 around the drive shaft 31 may be released, the drive shaft 31 may then rotate idle, and thereafter the coil spring 35 may be rotated again in the winding direction, so that a large torque (the sum of the inertia torque and the output torque of the motor) may be produced to further tighten the fastener.

In addition, the first representative fastener driving tool 1 may not produce any noisy impact sounds and may rotate substantially silent during the tightening operations, because the first representative fastener driving tool 1 may be configured without a hammer and an anvil (such as a hammer 162 and an anvil 161 of the known impact tool 150) that may produce impact sounds during the fastener driving operations.

Further, because the outer diameter of each of the drive shaft 31 and the spindle 32 may be determined such that the drive shaft 31 and the spindle 32 can be inserted into the coil spring 3 by a manual force of the operator with a relatively small resistance (a week press fitting force), the rotation of the drive shaft 31 may be transmitted to the spindle 32 via the coil spring 35 due to the frictional force. In other words, a part of the rotational torque of the drive shaft 31 may always be transmitted to the spindle 32 even if the drive shaft 31 rotates (slidably rotates) relative to the coil spring 35. Therefore, the tool bit that is attached to the spindle 32 may receive the rotational torque in the tightening direction before the fastener is tightened by the torque of the sum of the inertia torque and the motor torque. As a result, no clearance in the tightening direction may be produced between the spindle 32 and the tool bit and between the tool bit and the fastener. For example, if the spindle 32 has a square shaft end, the shaft end may closely contact a corresponding insertion hole formed in the tool bit (e.g. a socket), and the tool bit may closely contact a bit engaging recess formed in a head of a screw or a circumferential surface of a head of a bolt or nut. Therefore, the efficiency of transmission of the torque from the spindle 32 to the tool bit and to the fastener can be improved. In addition, no contact or impact sounds may be produced between the spindle 32 and the tool bit and between the tool bit and the fastener.

Figure 6:
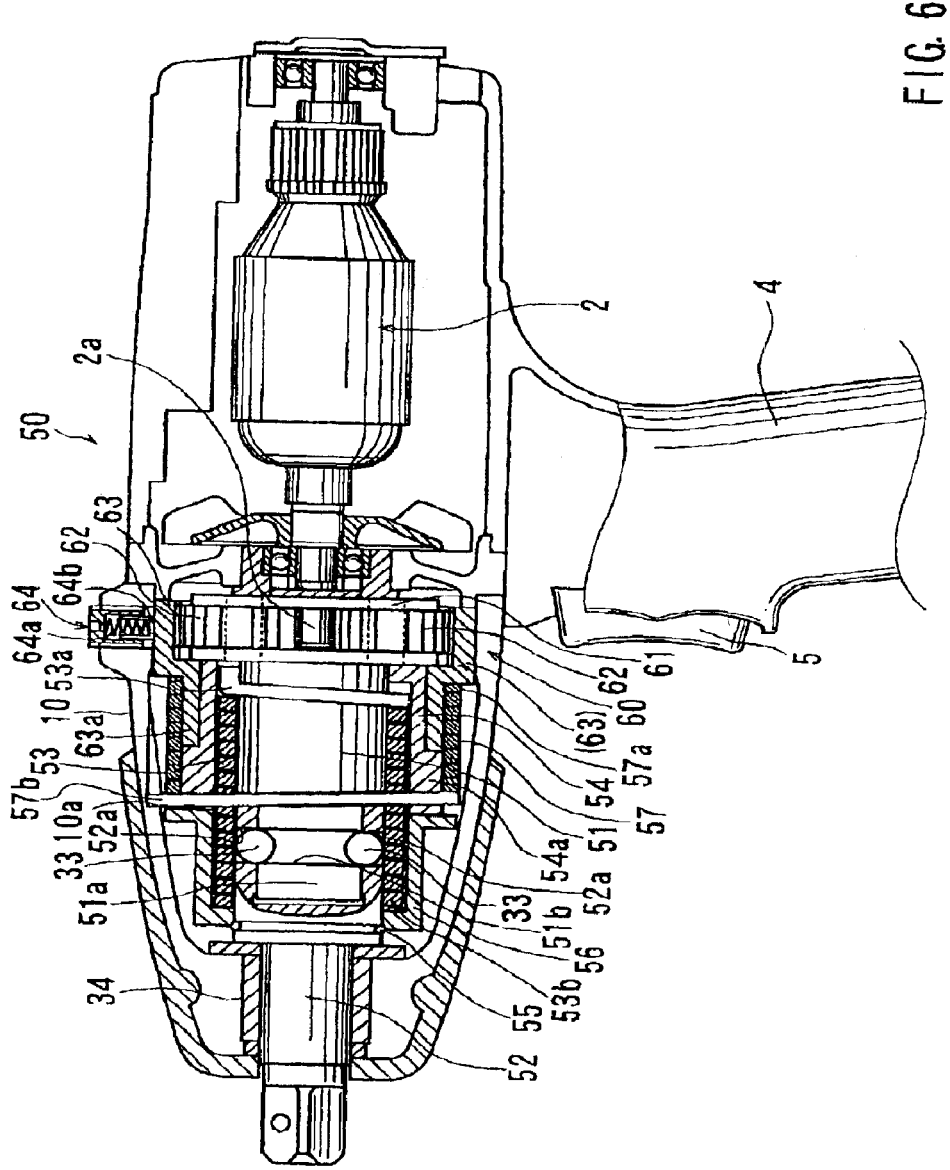
FIG. 6 is a side, cross-sectional view of a second representative fastener driving tool.

The first representative fastener driving tool 1 may be modified in various ways. FIG. 6 shows a second representative fastener driving tool 50 that is different from the first representative fastener driving tool 1 in the construction for releasing the tightening (torsion in the winding direction) of the coil spring 35 by the rotation of the internal gear 23. In other respect, the second representative fastener driving tool 50 may be the same as the first representative fastener driving tool. Therefore, in FIG. 6, like members are given the same reference numerals as the first representative fastener driving tool 1 and the explanation of these elements will not be necessary.

A planetary gear mechanism 60 of the second representative fastener driving tool 50 may include three planetary gears 62 that are rotatably supported by a carrier 61. The planetary gears 62 may engage the sun gear of the output shaft 2a of the electric motor 2 and may also engage an internal gear 63. The internal ear 63 may be rotatably supported within the main housing 10. A brake device 64 may be mounted on the main housing 10 and may serve to provide a predetermined resistance against rotation of the internal gear 63. More specifically, the brake device 64 may include a compression spring 64a and a pressing member 64b that is biased by the compression spring 64a, so that the pressing member 64b may be pressed against the outer circumferential surface of the internal gear 63 in order to provide the resistance against rotation of the internal gear 63 due to the frictional force.

The biasing force of the compression spring 64a of the brake device 64 may be chosen such that the internal gear 23 may be permitted to rotate when a large tightening resistance is applied by the fastener against rotation of the a spindle 52 in the same manner as the brake device 24 of the first representative embodiment. Therefore, no excessive load may be applied to the operator during the tightening operation.

A drive shaft 51 may be formed integrally with the carrier 61 of the planetary gear mechanism 60 and the spindle 52 may be rotatably supported by the front portion of the main housing 10 via the bearing 34. A first coil spring 53 may be fitted on the drive shaft 51 and the spindle 52 and may extend therebetween. More specifically, the right portion of the first coil spring 53 as viewed in FIG. 6 may be fitted on the drive shaft 31 and the left portion of the coil spring 53 may be fitted on the spindle 52. The drive shaft 51 and the spindle 52 may have the same outer diameter with each other and may be inserted into the first coil spring 53 without substantial clearance between the first coil spring 53 and each of the drive shaft 51 and the spindle 52. In addition, the drive shaft 51 and the spindle 52 may extend along the same axis as the rotational axis of the output shaft 2a of the motor 2.

Similar to the first representative embodiment, the steel balls 33 may be received within respective retaining holes 52a of the spindle 52 and may partly engage an annular circumferential recess 51b that is formed in a boss portion 51a of the drive shaft 51. The recess 51b may have a semi-circular configuration in cross section. Therefore, the spindle 52 may be coupled to the drive shaft 51 such that the spindle 52 can rotate relative to the drive shaft 51 but may not move in the axial direction relative to the drive shaft 51. The first coil spring 53 also may serve to prevent the steel balls 33 from being removed from the retaining holes 52a.

Preferably, the first coil spring 53 may be a left-hand coil spring and may be formed by a wire that has a square or rectangular configuration in cross section. An intermediate sleeve 54 may be rotatably received within a front portion 63a of the internal gear 63. The first coil spring 53 may be rotatably received within an intermediate sleeve 54. A right end 53a of the first coil spring 53 as viewed in FIG. 6 may be received within an engaging recess 54b that is formed in the intermediate sleeve 54. Therefore, the right end 53a may move in the releasing direction (loosening direction) to release the tightening of the first coil spring 53 around the drive shaft 51 when the intermediate sleeve 54 rotates in the left-hand direction (counterclockwise direction as viewed from the right side in FIG. 6).

A left end 53b of the first coil spring 53 may be pressed against a stopper ring 55 that is mounted on the spindle 52. The stopper ring 55 may be prevented from moving in the axial direction relative to the spindle 52.

Therefore, as the drive shaft 51 rotates in the right-hand direction (clockwise direction), the right end 53a of the first coil spring 53 may be forced to rotate in the winding direction (coiling direction), so that the rotation of the drive shaft 51 may be transmitted to the spindle 52 via the first coil spring 53. A tool bit, e.g. a hexagonal socket, may be attached to the spindle 52, so that fasteners, e.g. screws, bolts and nuts, may be tightened as the spindle 52 rotates in the clockwise direction (right-hand direction).

The intermediate sleeve 54 may have a front portion 54a that has a relatively large outer diameter than the remaining portion of the intermediate sleeve 54. On the other hand, the internal gear 63 may have a front portion 63a that has a relatively small diameter than the remaining portion of the internal gear 63. The outer diameter of the front portion 54a of the intermediate sleeve 54 may be substantially equal to the outer diameter of the front portion 63a of the internal gear 63. A second coil spring 57 may be fitted on the front portion 54a of the intermediate sleeve 54 and the front portion 63a of the internal gear and may extend therebetween. More specifically, the right portion of the second coil spring 57 may be fitted on the front portion 63a of the internal gear 63 and the left portion of the second coil spring 57 may be fitted on the front portion 54a of the intermediate sleeve 54. Preferably, the second coil spring 57 may be configured as a right-hand coil spring. In other words, the second coil spring 57 may be coiled in an opposite direction to the first coil spring 53. However, similar to the first coil spring 53, the second coil spring 57 may be made of a wire that has a square or rectangular configuration in cross section. A right end 57a of the second coil spring 57 on the side of the internal gear 63 may be pressed against a stepped portion 63b that is formed on the internal gear 63. On the other hand, a left end 57b of the second coil spring 57 on the side of the intermediate sleeve 54 may engage an engaging portion 10a that is formed on an inner wall of the main housing 10, so that the left end 57b may be prevented from rotating in the clockwise direction (right-hand direction) relative to the main housing 10 but can rotate in the counterclockwise direction (left-hand direction). Therefore, when the internal gear 63 rotates in the counterclockwise direction, the right end 57a of the second coil spring 57 may rotate in the counterclockwise direction, i.e. the winding direction (coiling direction) of the coil spring 57, so that the second coil spring 57 may be tightened around the front portion 63a of the internal gear 63 and around the front portion of 54a of the intermediate sleeve 54. As a result, the rotation of the internal gear 63 may be transmitted to the front portion 54a of the intermediate sleeve 54 via the second coil spring 57, so that the intermediate sleeve 54 rotates in the counterclockwise direction. As the intermediate sleeve 54 rotates in the counterclockwise direction, the right end 53a of the first coil spring 53 on the side of the drive shaft 51 may rotate in the counterclockwise direction, so that the tightening of the first coil spring 53 may be released.

The operation of the second representative fastener driving tool 50 will now be described. When the operator pulls the trigger 5 to start the electric motor 2, the planetary gears 62 of the planetary gear mechanism 60 may rotate together with the carrier 61 in the clockwise direction (right-hand direction), so that the drive shaft 51 rotates in the clockwise direction. Therefore, the first coil spring 53 may be tightened around the drive shaft 51 to rotate the output shaft 52 in the clockwise direction via the first coil spring 53, so that the fastener may be tightened by a torque that may correspond to the output torque of the electric motor 2.

As the fastener is tightened, the tightening resistance of the fastener may increase to exceed the tightening torque. Then, the rotation of the spindle 52 may be stopped and therefore, the rotation of the drive shaft 51 and the carrier 61 may be stopped. As a result, the internal gear 63 may start to rotate in the counterclockwise direction (left-hand direction) against the frictional resistance (braking force) applied by the brake device 64. As the internal gear 63 rotates in the counterclockwise direction, the right end of the second coil spring 57 may rotate in the same direction to tighten the second coil spring 57 around the front portion 63a of the internal gear 63, so that the rotation of the internal gear 63 may be transmitted to the front portion 54a of the intermediate sleeve 54 via the second coil spring 57.

Because the right end 53a of the first coil spring 53 engages the intermediate sleeve 54, the right end 53a of the first coil spring 53 also may rotate in the counterclockwise direction, which direction is opposite to the winding direction (coiling direction) of the first coil spring 53. Therefore, the first coil spring 53 may be loosened. As a result, no substantial tightening resistance may be applied to the drive shaft 51 via the first coil spring 53 against rotation of the drive shaft 51. At the same time, the rotation of the internal gear 63 may be stopped by the braking force applied by the brake device 64. Therefore, the planetary gears 62 may start to rotate together with the carrier 61. In addition, the right end 57a of the second coil spring 57 may recover its original position due to the resilient restoring force of the second coil spring 57. Further, the right end 53a of the first coil spring 53 and the intermediate sleeve 54 may recover its original position due to the resilient restoring force of the first coil spring 53. As a result, the drive shaft 51 may rotate idle. Then, the drive shaft 51 rotates the right end 53a of the first coil spring 53 in the winding direction (coiling direction), so that the spindle 52 may be rotated via the first coil spring 53. Therefore, the fastener can be tightened by a torque that may correspond to the sum of the rotational torque of the motor 2 and an inertia torque that may be produced by the rotation of the output shaft 2a of the motor 2, the planetary gears 62 and their carrier 61 and the drive shaft 51.

When the tightening resistance of the fastener exceeds the tightening torque, the rotation of the drive shaft as well as the spindle 52 may be again stopped, and the internal gear 63 may again rotate in the counterclockwise direction. Therefore, the fastener may be again tightened by the torque that corresponds to the motor torque and the inertia torque. This operation may be repeatedly performed in order to repeatedly tighten the fastener.

According to the second representative power fastener 50, the rotation of the internal gear 63 may be transmitted to the first coil spring 53 via the second coil spring 57 and the intermediate sleeve 54. Therefore, a lock device as the lock device 37 of the first representative embodiment may be eliminated. The second lock device 37 may produce clattering sounds at each time when the ball 37b engages the engaging recess 23b during the rotation of the actuation plate 36 relative to the internal gear 23. Thus, although the intermediate sleeve 54 of the second representative fastener driving tool 50 may rotate relative to the internal gear 63, the front portion 54a of the intermediate sleeve 54 may slidably rotate relative to the second coil spring 57 and may not produce any clattering sounds. Therefore, the second representative fastener driving tool 50 may be improved in further reducing noisy sounds.

The third representative embodiment will now be described with reference to FIG. 7, which shows a third representative fastener driving tool 70. A third representative fastener driving tool 70 is different from the second representative fastener driving tool 50, because the third representative power fastener 70 includes a mechanism for selectively preventing and permitting the rotation of an intermediate sleeve. In other respect, the third representative fastener driving tool 70 may be the same as the second representative fastener driving tool 50. Therefore, in FIG. 7, like members are given the same reference numerals and an explanation of these members will not be necessary.

Figure 7:
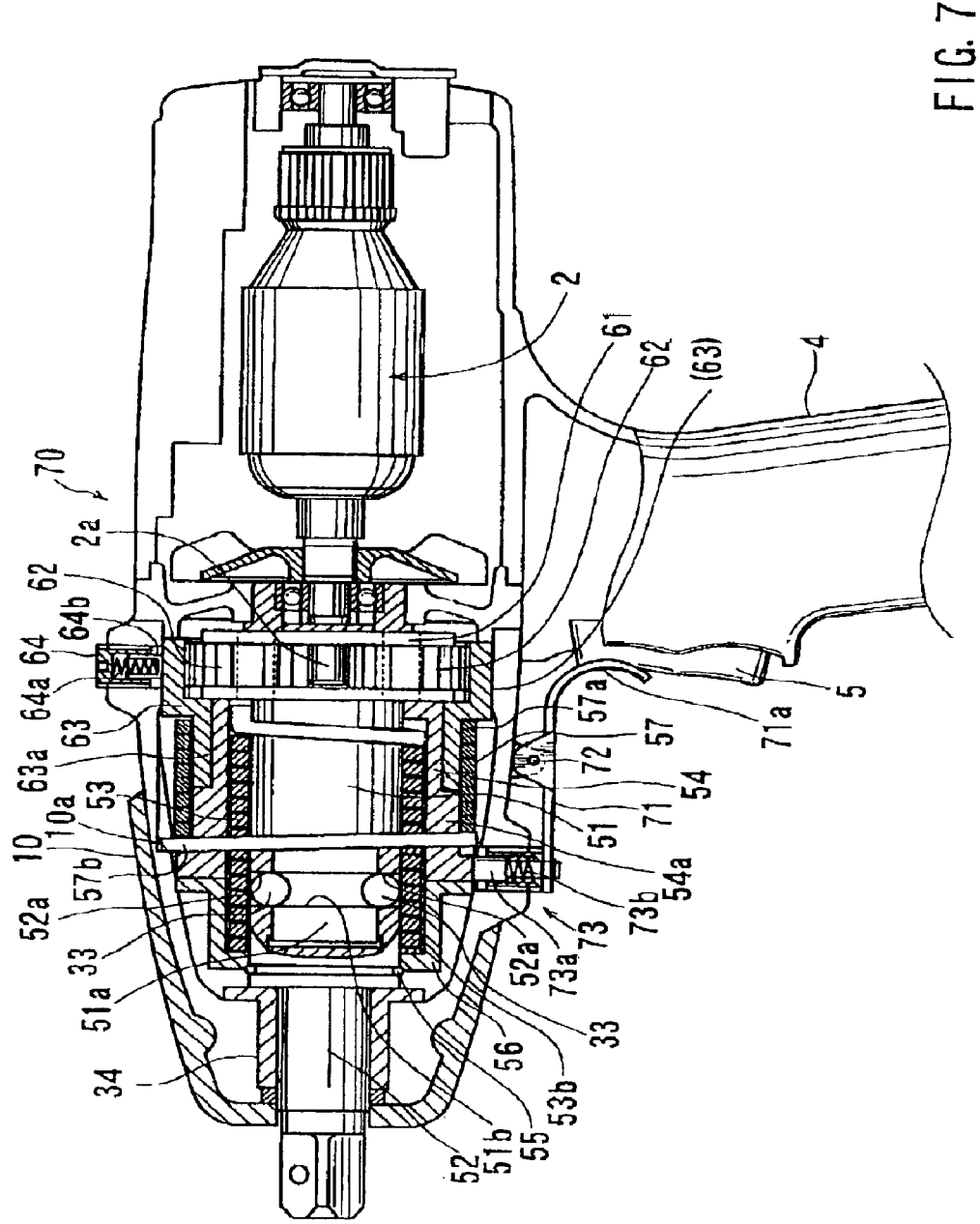
FIG. 7 is a side, cross-sectional view of a third representative fastener driving tool.

Referring to FIG. 7, the third representative fastener driving tool 70 may include a sleeve lock device 73 and a lock releasing lever 71 associated with the sleeve lock device 73. The lock releasing lever 71 may be mounted on the lower side of the front portion of the main housing 10 via a support pin 72, so that the lock releasing lever 71 can vertically pivot relative to the main housing 10. A finger engaging portion 71*a* may be formed on the rear portion (right portion as viewed in FIG. 7) of the lock releasing lever 71. Preferably, the finger engaging portion 71*a* may be curved to have a substantially J-shaped configuration, so that the operator can easily operate the lock releasing lever 71 by engaging his or her finger with the finger engaging portion 71*a*. The finger engaging portion 71*a* may be positioned adjacent the trigger 5, so that the operator can operate either the trigger 5 or the sleeve lock releasing lever 71, while he or she grasps the handle 4.

The sleeve lock device 73 may be coupled to the left portion of the lock releasing lever 71 and may include a lock pin 73*a* and a compression spring 73*b*. The lock pin 73*a* may extend through the wall of the main housing 10 and may be vertically slidably movable relative to the wall of the main housing 10. The compression spring 73*b* may bias the lock pin 73*a* toward inside of the main housing 10 so as to press the lock pin 73*a* against the outer circumferential surface of the front end of the intermediate sleeve 54. Therefore, the sleeve lock device 73 may be operable to prevent the intermediate sleeve 54 from rotation by the frictional force between the lock pin 73*a* and the intermediate sleeve 54.

The front end of the lock releasing lever 71 and the lower end of the lock pin 73*a* may be joined to each other such that they can incline relative to each other.

The operation of the third representative fastener driving tool 70 will now be described. When the operator pulls the lock releasing level 71 in the counterclockwise direction as viewed in FIG. 7 by engaging his or her finger with the finger engaging portion 71*a,* the lock pin 73*a* may moved downward against the biasing force of the compression spring 73*b,* so that the lock pin 73*a* may move away from the intermediate sleeve 54. Therefore, the intermediate sleeve 54 can rotate as the internal gear 63 rotates in the counterclockwise direction in order to release the tightening of the first coil spring 53. The fastener may then be tightened by a torque that may correspond to the sum of the motor torque and the inertia torque.

When the operator releases the finger engaging portion 71*a* of the lock releasing lever 71, the lock releasing lever 71 may pivot in the clockwise direction by the compression spring 73*b* and the lock pin 73*a* may be pressed against the intermediate sleeve 54. Because the intermediate sleeve 54 may not rotate even if the internal gear 63 rotates in the counterclockwise direction (left-hand direction), the right end 53*a* of the first coil spring 53 may not rotate to release the tightening of the first coil spring 53. In addition, the rotation of the internal gear 63 may be stopped due to the resistance applied by the second coil spring 57. Therefore, the drive shaft 51 may start to rotate idle and the rotation of the drive shaft 51 may not be transmitted to the spindle 52 via the first coil spring 53.

Thus, when the lock releasing lever 71 is not operated, the drive shaft 52 may rotate idle without transmitting the rotational torque to the spindle 52, so that the inertia torque may be produced by the rotation of the output shaft 2*a* of the motor 2, the planetary gears 62 and the drive shaft 51. When the operator operates the lock releasing lever 71 in this state, the intermediate sleeve 54 may rotate in the counterclockwise direction by the resilient restoring force of the first coil spring 53, so that the right end 53*a* of the first coil spring 53 may rotate in the winding direction (coiling direction) by the frictional force between the right portion of the first coil spring 53 and the drive shaft 51. As a result, the rotation of the drive shaft 51 may be instantaneously transmitted to the output shaft 52 and the fastener may be tightened by a large torque.

If the operator releases the lock releasing lever 71 at the time when the rotational speed of the drive shaft 51 has reached a maximum rotational speed during the idle rotation of the drive shaft 51, a maximum inertia torque (rotational energy) may be transmitted to the spindle 52.

When the tightening resistance of the fastener exceeds the tightening torque, the rotation of the output shaft 52, the first coil spring 53 and the drive shaft 51 may be stopped in the same manner as the second representative embodiment. Then, the internal gear 63 may rotate in the counterclockwise direction against the braking force applied by the brake device 64. Therefore, the right end 53*a* of the first coil spring 53 may rotate in the direction opposite to the winding direction (coiling direction) via the second coil spring 57 and the intermediate sleeve 54, because the intermediate sleeve 54 is not locked. As a result, the tightening of the first coil spring 53 may be released. Then, the rotation of the internal gear 63 may be stopped by the braking force of the brake device 64, and the drive shaft 51 may starts to again rotate to tighten the fastener by the torque that may be the sum of the motor torque and the inertia torque. This operation (tightening cycle) may be repeatedly performed as the tightening resistance of the fastener again exceeds the tightening torque.

If the operator releases his or her finger from the lock releasing lever 71, the lock releasing lever 71 may automatically pivot to prevent the intermediate sleeve 54 from rotation. Therefore, if the operator releases the lock releasing lever 71 after the tightening operation (tightening cycle) has been repeatedly performed by appropriate number of times, the drive shaft 51 may rotate idle and the rotation of the drive shaft 51 may not be transmitted to the spindle 52. This situation may be maintained as long as the lock releasing lever 71 is not operated to release the lock against the intermediate sleeve 54.

In addition, if the operator operates the lock releasing lever 71 while he or she adjusts the pulling force applied to the lock releasing lever 71, the lock of the intermediate sleeve 54 may be gradually released, so that the first coil spring 53 may be gradually tightened around the drive shaft 51. Therefore, the transmission of torque from the drive shaft 51 to the spindle 52 may be gently started. As a result, the inertia torque that may be applied to the fastener via the spindle 52 may be controlled by adjusting the pulling force applied to the lock releasing lever 71. This control may be particularly advantageous in order to avoid the fastener from being tightened by an excessive force.

According to the third representative power fastener 70, the rotation of the drive shaft 51 may be transmitted from the drive shaft 51 to the first coil spring 53 via the first coil spring 53 due to tightening of the first coil spring 53 around the drive shaft 51. Therefore, in the same manner as the first and second representative embodiments, the third representative fastener driving tool 70 can output a large tightening torque without producing noisy impact sounds.

In addition, also in the same manner as the first and second representative embodiments, the rotation of the drive shaft 51 may be transmitted to the spindle 52 via the first coil spring 53 due to the frictional force even if the drive shaft 51 rotates idle. Therefore, a tool bit attached to the spindle 52 may receive a small rotational torque in the tightening direction before the fastener is tightened by a large torque. As a result, no clearance in the tightening direction may be produced between the spindle 52 and the tool bit and between the tool bit and the fastener. Therefore, the efficiency of transmission of torque from the spindle 52 to the tool bit and further to the fastener can be improved. Further, no contact or impact sounds may be produced between the spindle 52 and the tool bit and between the tool bit and the fastener. Therefore, the third representative fastener driving tool 70 may operate without producing noisy sounds also in this respect.

Furthermore, also in the third representative power fastener 70, no clatter sounds may be produced, because a lock device that corresponds to the lock device 37 of the first representative power fastener 50 may be eliminated.

The fourth representative power fastener will now be described with reference to FIGS. 8 and 9. Also in these figures, like members are given the same reference numerals as the first to third representative embodiments and the explanation of these members will not be necessary.

Figure 8:
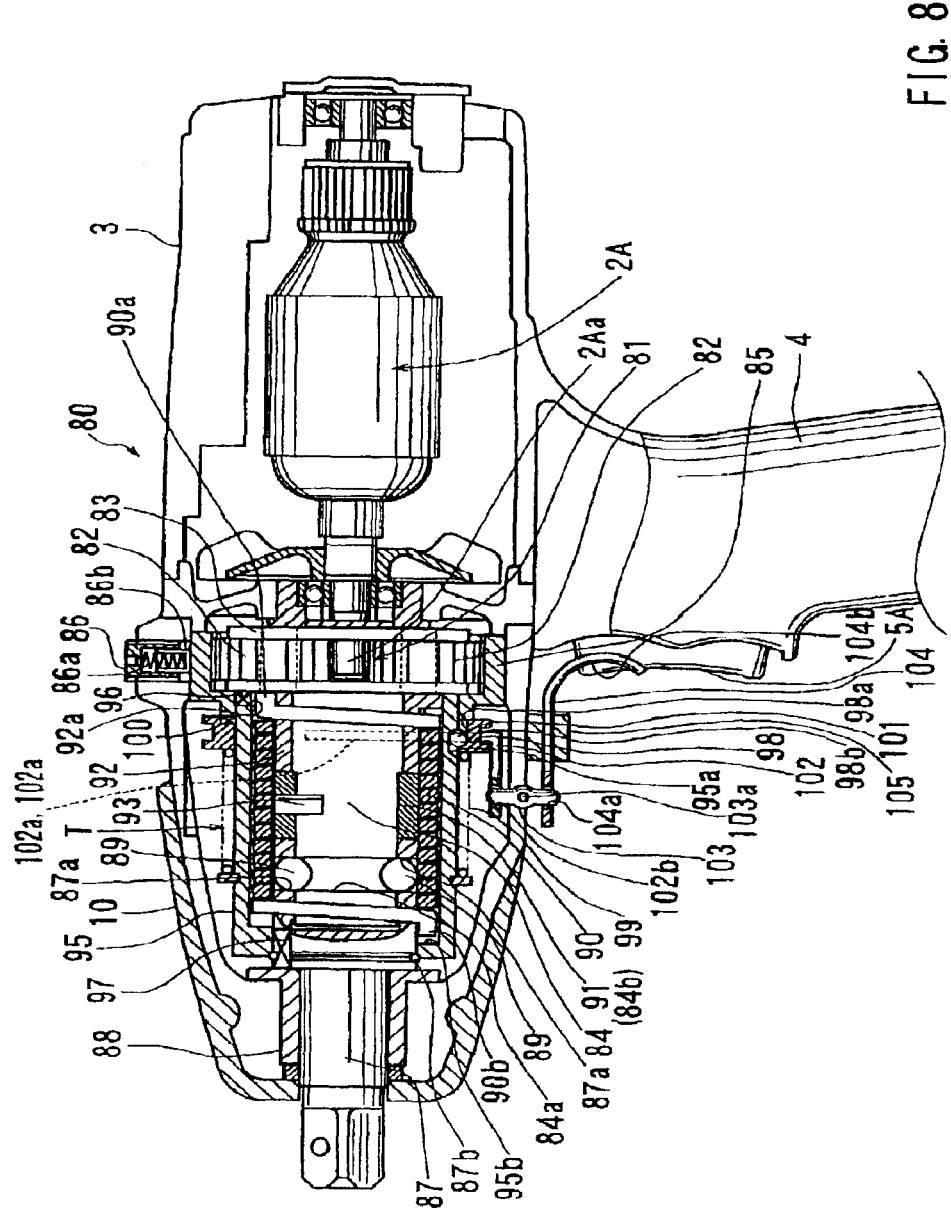
FIG. 8 is a side, cross-sectional view of a fourth representative fastener driving tool.

Referring to FIG. 8, the fourth representative fastener driving tool 80 may include a reversible electric motor 2A as the drive unit (power source).

A trigger 5A may be mounted on the handle 4 adjacent the main body 3. The trigger 5A may be configured as a seesaw type trigger and may pivot between a first ON position and a second ON position via an OFF position. FIG. 8 shows the trigger 5A in the OFF position.

More specifically, the trigger 5A may be electrically connected to the motor 2A via a motor circuit (not shown), so that the motor 2A rotates in a first direction (also referred to as "normal direction") when the operator pivots the trigger 5A from the OFF position to the first ON position. The motor 2A may rotate in a second direction (also referred to as "reverse direction") when the operator pivots the trigger 5A from the OFF position to the second ON position. As the motor 2A rotates in the normal direction, a spindle 87 may rotate in the clockwise direction (right-hand direction), so that a fastener can be tightened. On the other hand, as the motor 2A rotates in the reverse direction, the spindle 87 may rotate in the counterclockwise direction (left-hand direction), so that the fastener can be loosened.

A planetary gear mechanism 81 may include a pair of planetary gears 82 that engage a sun gear formed on an output shaft 2Aa of the motor 2A. The planetary gears 82 may be rotatably supported by a carrier 83. A drive shaft 84 may be formed integrally with a front surface (left surface as viewed in FIG. 8) of the carrier 83 and may extend along the same axis as the output shaft 2Aa of the motor 2A.

The planetary gears 82 may also engage an internal gear 85 that is rotatably supported within the main housing 10. A brake device 86 may be mounted on the main housing 10 and may serve to apply a predetermined resistance against the rotation of the internal gear 85. The brake device 86 may include a compression spring 86a and a pressing member 86b. The pressing member 86b may be pressed against the outer circumferential surface of the internal gear 85 so as to produce a frictional force against the rotation of the internal gear 85.

The front portion of the drive shaft 84 may be coupled to the spindle 87 that is rotatably supported within the front portion of the main housing 10 via a bearing 88. An annular circumferential recess 84a may be formed in circumferential surface of the front portion of the drive shaft 84. Preferably, the recess 84a may have a semicircular configuration in cross section. A pair of steel balls 89 may be received within corresponding retaining holes 87a that are formed in the spindle 87. The steel balls 89 may partly engage the recess 84a of the drive shaft 84, so that the spindle 87 can rotate relative to the drive shaft 84 but cannot move in the axial direction relative to the drive shaft 84. A coil spring 90 may be fitted on the drive shaft 84 and the spindle 87 and may extend therebetween. The front portion of the coil spring 90 may prevent the steel balls 89 from being removed from the retaining holes 87a.

An auxiliary sleeve 91 and a rotary sleeve 92 may be fitted on the drive shaft 84 and may be disposed on the rear side (right side as viewed in FIG. 8) of the spindle 87. The auxiliary sleeve 91 may be fixed in position with regard to the rotation and also may be fixed in position in the axial direction relative to the drive shaft 84 via a pin 93. The auxiliary sleeve 91 may serve as a large diameter portion 84b of the drive shaft 84 that is positioned at substantially the central position in the axial direction of the drive shaft 84. Alternatively, the large diameter portion 84b may be formed integrally with the drive shaft 84.

The rotary sleeve 92 may be positioned between the large diameter portion 84b of the drive shaft 84 and the front portion of the carrier 83, so that the rotary sleeve 92 can rotate relative to the drive shaft 84 but cannot move in the axial direction relative to the drive shaft 84. As shown in FIG. 8, the spindle 87, the large diameter portion 84b and the rotary sleeve 92 may have the same outer diameter with each other and the coil spring 90 may be fitted to receive these elements. Preferably, the coil spring 90 may be a left-hand coil spring and may be made of a wire that has a square or rectangular configuration in cross section.

Figure 9:
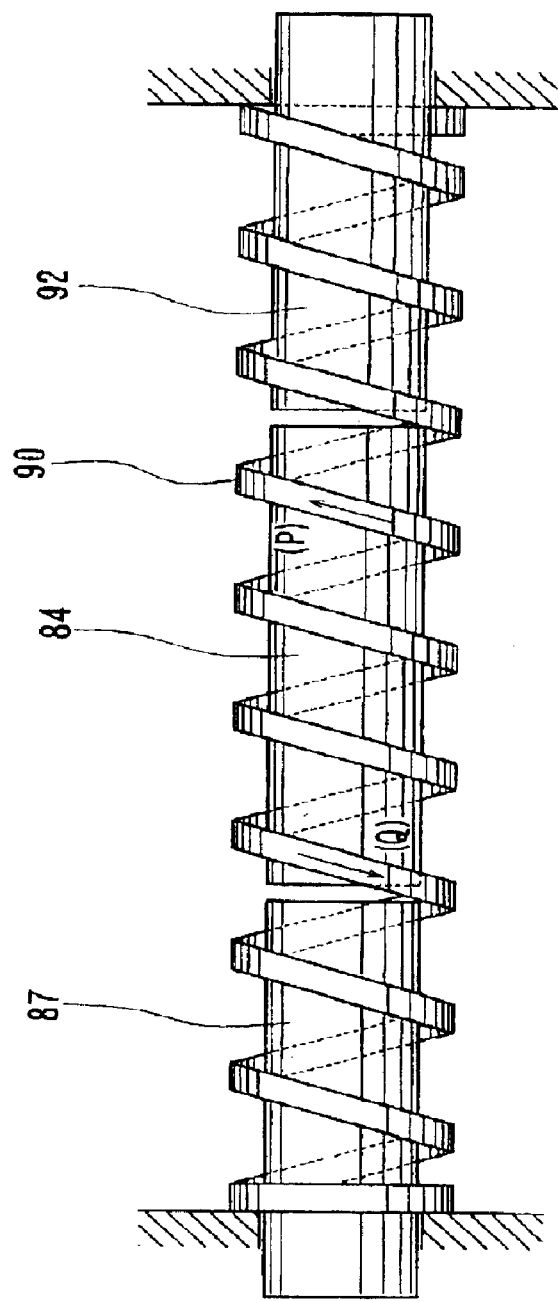
FIG. 9 is a schematic side view of a torque transmission device of the fourth representative fastener driving tool.
Figure 10:
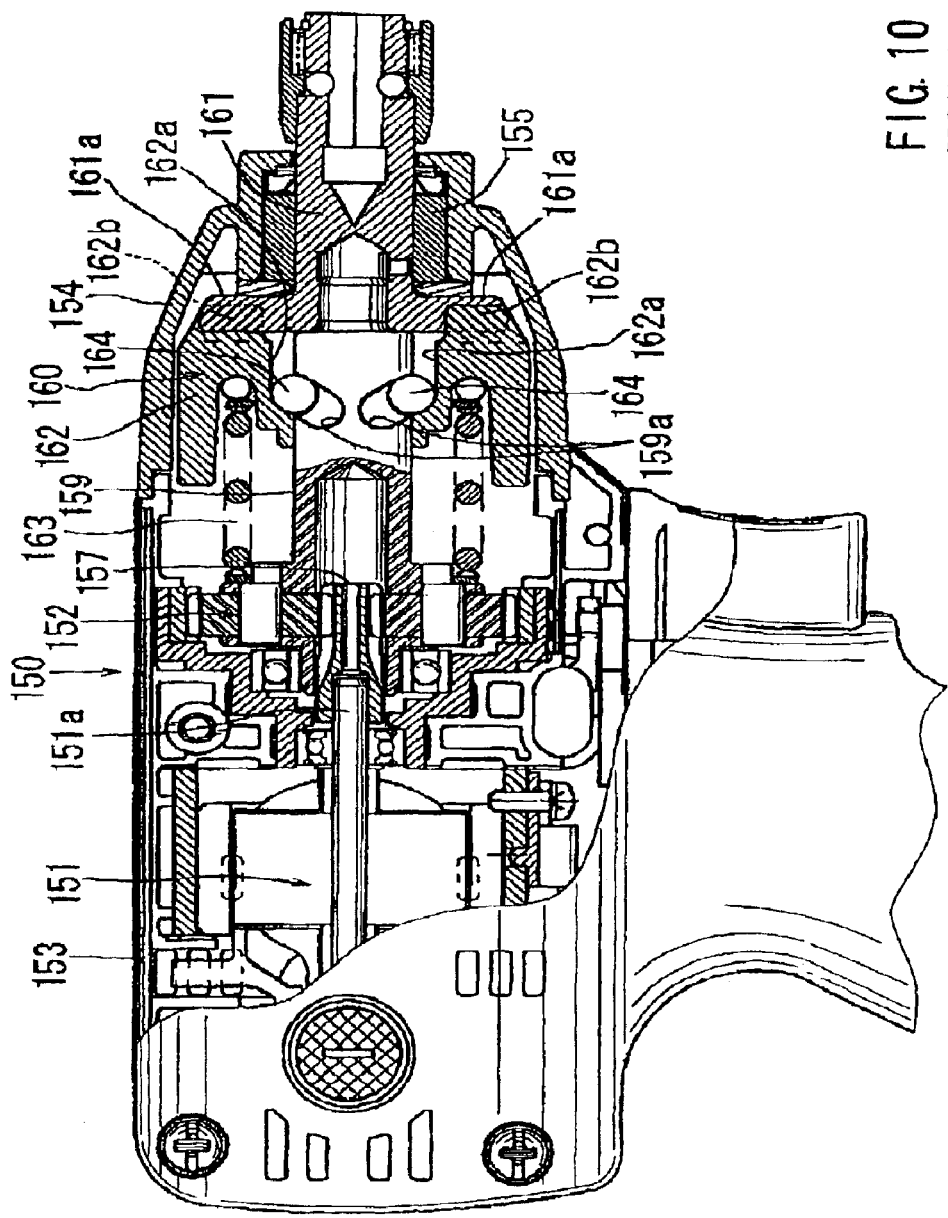
FIG. 10 is a side, cross-sectional view of a known impact tool.

FIG. 9 schematically shows the drive shaft 84, the spindle 87 and the coil spring 90. The operation of the coil spring 90 will now be explained with reference to FIG. 9 in connection with the rotation of the drive shaft 84 in the right-hand direction (clockwise direction as viewed from the right side of FIG. 9 and the left-hand direction (counterclockwise direction).

When the drive shaft 84 rotates in the clockwise direction, a middle portion of the coil spring 90 that contacts the large diameter portion 84a (not shown in FIG. 9) of the coil spring 90 may rotate in a direction P as indicated in FIG. 9 due to the frictional force against the large diameter portion 84a of the drive shaft 84. As a result, the coil spring 90 may be rotated (twisted) at the middle portion in the clockwise direction. On the other hand, when the drive shaft 84 rotates in the counterclockwise direction, the middle portion of the coil spring 90 may rotate in a direction Q as indicated in FIG. 9 also due to the frictional force against the large diameter portion 84a of the drive shaft 84. As a result, the coil spring 90 may be rotated (twisted) at the middle portion in the counterclockwise direction. This operation may be substantially the same even if the coil spring 90 is configured as a right-hand coil spring.

Referring to FIG. 8, when the motor 2 starts to rotate in the clockwise direction (right-hand direction), the middle portion of the coil spring 90 may rotate, so that the left portion of the coil spring 90 may be twisted in the same direction that is the winding direction (coiling direction) of the left side portion of the coil spring 90. As a result, a moment may be produced to rotate a left end 90b of the coil spring 90 in the same direction. Therefore, the spindle 87 may rotate in the right-hand direction due to the frictional force between the spindle 87 and the left portion of the coil spring 90. On the other hand, although the right portion of the coil spring 90 may be rotated (twisted) in the clockwise direction, this direction may be opposite to the winding direction (coiling direction) of the right portion of the coil spring 90. Because, the right portion of the coil spring 90 may be rotated (twisted) in the opposite direction that may be a releasing direction, no substantial moment may be produced to rotate a right end 90a of the coil spring 90 in the clockwise direction. As a result, the rotary sleeve 92 will not receive a substantial moment in the clockwise direction. Consequently, when the drive shaft 84 rotates in the clockwise direction, the rotary sleeve 92 may not rotate although the spindle 87 may rotate.

On the contrary, when the motor 2 rotates in the counterclockwise direction (left-hand direction), the middle portion of the coil spring 90 may rotate in the counterclockwise direction. As a result, a moment may be produced to rotate the right end 90a of the coil spring 90 in the same direction but no substantial moment may be produced to rotate the left end 90b of the coil spring 90 in the same direction. As a result, the rotary sleeve 92 may rotate in the counterclockwise direction due to the frictional force between the rotary sleeve 92 and the right portion of the coil spring 90. However, the spindle 87 will not rotate in this case.

Referring to FIG. 8, the right end 90a of the coil spring 90 may be inserted into and engage with an engaging hole 92a that is formed in the rotary sleeve 92. On the other hand, the left end 90b of the coil spring 90 may be inserted into and engage with an engaging hole 95b that is formed in an intermediate sleeve 95. The intermediate sleeve 95 may be arranged to receive the drive shaft 84, the spindle 87, the rotary sleeve 92 and the coil spring 90 and may extend along the same axis as these elements.

The intermediate sleeve 95 may be coupled to the spindle 87 via a first engaging mechanism 97, so that the intermediate sleeve 95 and the spindle 87 may rotate in unison with each other. A stopper ring 87b may be attached to the spindle 87 and may serve to restrain the leftward movement of the intermediate sleeve 95 relative to the spindle 87 and to prevent rattling of the intermediate sleeve 95. The intermediate sleeve 95 also may be coupled to the rotary sleeve 92 via a second engaging mechanism 96, so that the intermediate sleeve 95 and the rotary sleeve 92 may rotate in unison with each other.

As annular clutch plate 98 may be slidably fitted on the intermediate sleeve 95. A steel ball 101 may be interposed between the clutch plate 98 and the intermediate sleeve 95. The steel ball 101 may engage a guide recess 95a formed in the outer peripheral surface of the intermediate sleeve 95 and may also engage a retaining recess 98a formed in the inner peripheral surface of the clutch plate 98. The retainer recess 98a may have a substantially hemispherical configuration. The guide recess 95a may be elongated in the axial direction of the intermediate sleeve 95 and may have a substantially semicircular configuration in cross section. Therefore, the clutch plate 98 may rotate in unison with the intermediate sleeve 95 and may move relative to the intermediate sleeve 95 in the axial direction within a range that is determined by the length of the guide recess 95a.

Clutch teeth 100 may include first teeth and second teeth (not shown) that are formed on the clutch plate 98 and the internal gear 85, respectively, so that the clutch plate 98 and the internal gear 85 may rotate in unison with each other when the first and second teeth of the clutch teeth 100 engage with each other. Therefore, the intermediate sleeve 95 and the internal gear 85 may be connected to each other with regard to rotation via the clutch plate 98. A compression spring 99 may serve to bias the clutch plate 98 in the right direction, so that the clutch plate 98 can be held in a position shown in FIG. 8, where the first and second teeth of the clutch teeth 100 engage with each other. When the clutch plate 98 is moved leftward from the position shown in FIG. 8 against the biasing force of the compression spring 99, the first teeth and the second teeth of the clutch teeth 100 may be disengaged, so that the clutch plate 98 and the internal gear 85 may be disconnected from each other with respect to rotation.

An annular engaging recess 98b may be formed in the outer peripheral surface of the clutch plate 98. A switching plate 102 may have a pair of actuation arms 102a that are inserted into the engaging recess 98b from opposite sides in the diametrical direction of the clutch plate 98, so that the clutch plate 98 can rotate relative to the switching plate 102 but can move in the axial direction as the switching plate 102 moves in the axial direction.

Therefore, the first and second clutch plate of the clutch plate 100 may be engaged and disengaged in response to the movement of the switching plate 102 in the axial direction of the clutch plate 98 (right and left directions as viewed in FIG. 8).

A pivotal arm 103 may be vertically pivotally mounted on the main housing 10 via a pivot pin 103a. An upper end of the pivotal arm 103a may be positioned within the main housing 10 and may be inserted into an engaging hole 102b that is formed in the switching plate 102. A lower end of the pivotal arm 103a may be positioned outside of the main housing 10 and may be inserted into an engaging hole 104a that is formed in a switching lever 104. The switching lever 104 may be supported by a support member 105 that is attached to the lower surface of the main housing 10, so that the switching level 104 can slidably move relative to the support member 105 in a direction parallel to the axial direction of the clutch plate 98. Thus, the switching lever 104 may be coupled to the clutch plate 98 via the switching plate 102 and the pivotal arm 103.

Because the switching lever 104 may be coupled to the clutch plate 98 that is biased rightward by the compression spring 99, the biasing force of the compression spring 99 may urge the switching lever 104 to move leftward. Therefore, when the operator pulls the switching lever 104 to move rightward against the biasing force of the compression spring 99, the pivotal arm 103 may pivot in a counterclockwise direction as viewed in FIG. 8, so that the clutch plate 98 may move leftward to disengage the first clutch teeth and the second clutch teeth of the clutch teeth 100 from each other. When the operator releases the pulling force applied to the switching lever 104, the switching lever 104 may automatically return to cause engagement between the first clutch teeth and the second clutch teeth.

As shown in FIG. 8, the switching lever 104 may have a finger engaging portion 104b that is bent to have a substantially J-shaped configuration. The finger engaging portion 104b may be positioned adjacent the trigger 5A, so that the operator can operate either the switch lever 104 or the trigger 5A, while he or she grasps the handle 4.

The operation of the fourth representative fastener driving tool 80 will now be described. When the operator pivots the trigger 5A from the OFF position to the first ON position, the motor 2A may start to rotate in the clockwise direction, i.e., normal direction. Because the internal gear 85 of the planetary gear mechanism 81 is prevented from rotation by the brake device 86, the drive shaft 84 may rotate in the clockwise direction together with the carrier 83 of the planetary gear mechanism 81. At this stage, the switching lever 104 is not pulled by the operator. Therefore, the internal gear 85 may be connected to the intermediate sleeve 95 via the clutch plate 98 in the rotational direction. Because the intermediate sleeve 95 is connected to the rotary sleeve 92 via the engaging mechanism 96 with regard to rotation, the braking force also may be applied to the intermediate sleeve 95 and the rotary sleeve 92. Therefore, the intermediate sleeve 95 and the rotary sleeve 92 may not be rotated. As a result, although the middle portion of the coil spring 90 may be rotated due to the frictional force against the drive shaft 84, the rotation of the drive shaft 84 may not be transmitted to the spindle 87. In other words, although the middle portion of the coil spring 90 may be twisted relative to the right and left portions due to the frictional force between the middle portion of the coil spring 90 and the drive shaft 84, the right end 90a or the left end 90b of the coil spring 90 may not rotate. Consequently, the drive shaft 84 may rotate idle.

As the drive shaft 84 rotates idle, the rotational speed of the drive shaft 84 as well as the rotational speed of the motor 2A and the planetary gears 82 soon reach a maximum rotational speed. When the operator pulls the switching lever 104 in this state, the clutch plate 98 may move leftward as viewed in FIG. 8, so that the clutch teeth 100 may be disengaged. Therefore, the intermediate sleeve 95 and the rotary sleeve 92 may be disconnected from the internal gear 85 with regard to rotation. At the same time, the twisted coil spring 90 may resiliently recover the original non-twisted configuration and the right end 90a or the left end 90b may rotated relative to the middle portion.

As soon as the coil spring 90 recovers its original configuration, the coil spring 90 may rotate in the clockwise direction (right-hand direction) due to rotation of the drive shaft 84. Therefore, the left portion of the coil spring 90 may be twisted in the winding direction (coiling direction) to apply a rotational moment to the spindle 87 via the left end 90b. As a result, the spindle 87 may rotate in the clockwise direction. The rotary sleeve 92 may not receive a substantial rotational moment by the coil spring 90, because the right portion of the coil spring 90 may be twisted in the releasing direction that is opposite to the winding direction.

Therefore, the output shaft 87 may be immediately rotated by a torque that may be the sum of the rotational torque of the motor 2A and the inertia torque of the output shaft 2Aa of the motor 2, the planetary gears 82, the carrier 83 and the drive shaft 84. The fastener may be tightened as the tool bit is rotated in the clockwise direction via the spindle 87.

During the tightening operation, the operator must hold the fastener driving tool 80 via the handle 4 so as to bear the rotational torque that may be produced by the resistance against the tightening force applied by the motor 2A via the output shaft 2Aa. When the resistance against the tightening force increases to exceed the tightening force, the rotation of the spindle 87 may be stopped, so that the rotation of drive shaft 84 as well as the coil spring 90 may be stopped. Then, the integral gear 85 may rotate in the counterclockwise direction (left-hand direction) against the braking force applied by the brake device 86 and the rotational torque applied to the operator may be reduced. Therefore, the braking force of the brake device 86, which braking force may be determined by the biasing force of the compression spring 86a, may be suitably determined such that an excessive load may not be applied to the operator during the tightening operation.

When the operator releases the switching lever 104 during the rotation of the internal gear 85 in the counterclockwise direction, the first teeth and the second teeth of the clutch teeth 100 may engage with each other in order to connect the integral gear 85 to the intermediate sleeve 95 with regard to the rotation. Then, the rotary sleeve 92 may rotate in the counterclockwise direction, so that the right end 90a of the coil spring 90 may rotate in the opposite direction to the winding direction (coiling direction). As a result, the tightening of the left portion of the coil spring 90 around the drive shaft 84 may be released. Because the drive shaft 84 may no longer receive the resistance against rotation by the fastener via the spindle 87 and the coil spring 90 in this state, the rotation of the internal gear 85 may be stopped and the drive shaft 84 may start to again rotate. As a result, the fastener may be again tightened by a large torque.

The operator may repeatedly pulls and release the switching lever 104 until the fastener is tightened by a desired tightening torque. After the fastener has been tightened by a desired torque, the operator may held the switching lever 104 in the releasing position, so that the drive shaft 84 continues to rotate idle. Otherwise, the operator may pivot the trigger 5A to the OFF position in order to stop the motor 2A.

If the operator desires to loosen the fastener, he or she may pivot the trigger 5A to the second ON position, so that the motor 2A may rotate in the reverse direction (counterclockwise direction). The rotation of the motor 2A may be transmitted to the drive shaft 84 via the planetary gears 82, so that the drive shaft 84 rotates in the counterclockwise direction. At this stage, the switching lever 104 is not pulled by the operator. Therefore, the intermediate sleeve 95 and the rotary sleeve 92 may be prevented from rotation by the braking force applied to the internal gear 85, so that the drive shaft 84 may rotate idle. This operation is substantially the same as the operation when the motor 2A rotates in the normal direction (clockwise direction) except for the rotational direction.

When the operator pulls the switching level 104, the clutch teeth 100 may be disengage, so that the intermediate sleeve 95 and the rotary sleeve 92 may be disconnected from each other with regard to rotation. Therefore, the middle portion of the coil spring 90 may be rotated in the counterclockwise direction to transmit the rotation to the rotary sleeve 92, because the right portion of the coil spring 90 may be twisted in the winding direction to be tightened around the rotary sleeve 92. The rotation of the middle portion of the coil spring 90 may not be transmitted to the spindle 87, because the left portion of the coil spring 90 may be twisted in the releasing direction that is opposite to the winding direction (tightening direction) around the output shaft 87.

The rotation of the rotation reversing sleeve 92 may be transmitted to the spindle 87 via the intermediate sleeve 95, so that the output shaft 87 may rotate in the counterclockwise direction (left-hand direction) to loosen the fastener. In the same manner as the tightening operation, the loosening torque that may corresponds to the sum of the output torque of the motor 2A and the inertia torque of the output shaft 2Aa of the motor 2, the planetary gear 82, the carrier 83 and the drive shaft 84 may be transmitted to the spindle 84, so that the fastener can be effectively loosened.

If the fastener cannot be loosened by the loosening torque applied by the spindle 84 (if the resistance of the fastener exceeds the loosening force), the internal gear 85 may rotate in the clockwise direction against the braking force applied by the brake device 86. Then, the intermediate sleeve 95 may rotate in the clockwise direction, so that the left end 90b of the coil spring 90 may rotate in the releasing direction to release the tightening of the left portion of the coil spring 90 around the drive shaft 84. As a result, the drive shaft 84 may again rotates idle.

When the operator pulls the switching lever 104 to disengage the clutch teeth 100, the coil spring 90 may resiliently recover the original configuration and then may rotate together with the drive shaft 84 in the counterclockwise direction. As the coil spring 90 rotates in the counterclockwise direction, the right portion of the coil spring 90 may be twisted in the winding direction to be tightened around the rotary sleeve 92, so that the rotation of the coil spring 90 may be transmitted to the spindle 87 via the rotary sleeve 92 to again loosen the fastener.

The pulling and releasing operations of the switching lever 104 may be repeatedly performed until the fastener is completely loosened.

The first to fourth representative power fasteners 1, 50, 70 and 80 may be modified in various ways. For example, the torque transmission mechanisms of these representative embodiments may be applied to any other power tools than power driven fasteners. For example, the torque transmission mechanisms may be applied to any other rotary power tools, e.g. power drills, circular saws and planers in addition to fastener driving tools. In addition, the representative torque transmission mechanisms also may be applied to reciprocating saws and jigsaws, in which the rotational movement is converted into the reciprocating movement. Furthermore, the representative torque transmission mechanisms may be applied to hydraulic and pneumatic tools and may be applied to any other machines and apparatus in addition to power tools.

What is claimed is:

1. A torque transmission mechanism, comprising:
    a drive shaft having an axis and arranged and constructed to rotate about the axis,
    a driven shaft extending along substantially the same axis as the drive shaft,
    a torque accumulator arranged and constructed to accumulate a rotational torque of the drive shaft and to transmit the rotational torque to the driven shaft due to a frictional force, and
    a controller arranged and constructed to control the accumulation of the torque in the torque accumulator,
    wherein the torque accumulator comprises a resilient member that has a resiliency in a substantially rotational direction of the driven shaft, the resilient member comprises a coil spring, the coil spring extends substantially linearly along the same axis as the drive shaft and the driven shaft, the coil spring has a first end and a second end opposite to the first end, the first end is coupled to the controller, and the second end is coupled to the driven shaft,
    wherein the controller is operable rotate the first end in the opposite direction to the rotational direction of the drive shaft in order to release the tightening force of the second portion of the coil spring around the driven shaft, the controller comprises a control member and an actuator that is arranged and constructed to rotate the control member, and the control member is coupled to the first end of the coil spring,
    wherein the actuator is driven by a power unit that also drives the drive shaft.

2. A torque transmission mechanism as in claim 1, wherein the power unit comprises a motor, and the actuator rotates the control member in the opposite direction to the rotational direction of the motor.

3. A torque transmission mechanism as in claim 1, wherein:
    the controller comprises a switching device that is arranged and constructed to be switched between a torque accumulation mode and a torque releasing mode,
    in the toque accumulation mode, the rotational torque of the drive shaft is accumulated in the torque accumulator but is not transmitted to the driven shaft,
    in the torque releasing mode, the accumulated torque in the torque accumulator is released to rotate the driven shaft, and
    the switching device is operable to prevent and permit rotation of the control member in the torque accumulation mode and the torque releasing mode, respectively.

4. A torque transmission mechanism as in claim 3, wherein the switching device comprises a lever and a lock device, the lever is arranged and constructed to be operable by the operator, and the lock device is coupled to the lever, so mat the lock device can lock and unlock the control member by the operation of the lever.

5. A torque transmission mechanism as in claim 3, wherein the switching device comprises a lever and a clutch plate, the lever is arranged and constructed to be operable by an operator, the clutch plate is coupled to the control member so as to rotate with the control member, and the clutch plate and the internal gear are engageable with each other by means of clutch teeth.

6. A torque transmission mechanism as in claim 1, wherein the torque accumulator is arranged and constructed to accumulate the rotational torque of the drive shaft in both first and second directions that are opposite to each other.

7. A torque transmission mechanism as in claim 1, wherein the coil spring is arranged and constructed to accumulate the rotational torque of the drive shaft in both first and second directions that are opposite to each other, and the rotational torque in the first and second directions is transmitted to the driven shaft via different transmission paths.

8. A torque transmission mechanism as in claim 7, further including a transmission device that is arranged and constructed to provide the transmission path when the drive shaft rotates in the first direction.

9. A torque transmission mechanism as in claim 8, wherein:
    the transmission device comprises a rotary member that is rotatable relative to the drive shaft around the same axis as the drive shaft,
    the controller comprises a control member, wherein the rotary member is coupled to the driven shaft via the control member,
    the coil spring includes a first portion, a second portion and a third portion, the first portion and the second portion being fitted on the drive shaft and the driven shaft, respectively, the third portion being fitted on the rotary member, and the first portion being positioned between the second and third portions,
    when the drive shaft rotates in the first direction, the third portion of the coil spring is tightened around the rotary member to transmit the rotational torque to the driven shaft via the transmission device, while the second portion of the coil spring is not tightened around the driven shaft, and
    when the drive shaft rotates in the second direction, the second portion of the coil spring is tightened around the driven shaft to transmit the rotational torque to the driven shaft, while the third portion of the coil spring is not tightened around the rotary member.

10. A torque transmission mechanism as in claim 8 wherein the coil spring has the first and second ends, one of which is coupled to the control member via the rotary member.

11. A torque transmission mechanism as in claim 1, further including a switching device arranged and constructed to be operable by an operator for switching between a transmission mode and a non-transmission mode.

12. A torque transmission mechanism, comprising:
a drive shaft having an axis and arranged and constructed to rotate about the axis,
a driven shaft extending along substantially the same axis as the drive shaft,
a torque accumulator arranged and constructed to accumulate a rotational torque of the drive shaft and to transmit the rotational torque to the driven shaft due to a frictional force, and
a controller arranged and constructed to control the accumulation of the torque in the torque accumulator,
wherein the torque accumulator comprises a resilient member that has a resiliency in a substantially rotational direction of the driven shaft, the resilient member comprises a coil spring, the coil spring extends substantially linearly along the same axis as the drive shaft and the driven shaft, the coil spring has a first end and a second end opposite to the first end, the first end is coupled to the controller, and the second end is coupled to the driven shaft,
wherein the controller is operable rotate the first end in the opposite direction to the rotational direction of the drive shaft in order to release the tightening force of the second portion of the coil spring around the driven shaft, the controller comprises a control member and an actuator that is arranged and constructed to rotate the control member, and the control member is coupled to the first end of the coil spring, wherein:
the actuator comprises a planetary gear mechanism that includes a sun gear, a plurality of planetary gears engaging the sun gear, an internal gear engaging and enclosing the planetary gears, and a carrier rotatably supporting the planetary gears, and
the controller comprises a coupling device that is arranged and constructed to couple the integral gear to the control member with regard to rotation.

13. A torque transmission mechanism as in claim 12, wherein:
the controller further includes a brake device that is arranged and constructed to apply a braking force to the internal gear of the actuator and to allow rotation of the internal gear when a predetermined rotational force is applied to the internal gear,
the coupling device is arranged and constructed to selectively connect the internal gear to the control member and disconnect the integral gear from the control member with regard to rotation,
when a load applied to the driven shaft is smaller man a predetermine value, the internal gear is prevented from rotation by the braking force of the brake device, so that the carrier rotates in the direction opposite to the rotational direction of the motor and the rotation of the carrier is then transmitted to the driven shaft via the drive shaft: and the coil spring, while the coupling device disconnects the control member from the internal gear, so that the control member rotates with the coil spring relative to the internal gear,
when the load applied to the driven shaft is greater than the predetermined value, the driven shaft, the coil spring, the drive shaft and the carrier are prevented from rotation, so that the internal gear rotates against the braking force applied by the brake device, and the rotation of the internal gear is transmitted to the control member via me coupling device.

14. A torque transmission mechanism as in claim 12, wherein the coupling device is arranged and constructed to prevent and permit the rotation of the control member relative to the internal gear in response to the transmission torque between the control member and the internal gear.

15. A torque transmission mechanism as in claim 14, wherein the coupling device includes a recess formed in one of the control member and the internal gear, and a ball engaging the recess, and a spring supported by the other of the control member and the internal gear so as to bias the ball in an engaging direction with the recess.

16. A torque transmission mechanism as in claim 12, wherein the coupling device includes a second coil spring that is interposed between the control member and the internal gear, the second coil spring is coiled in an opposite direction to a coiling direction of the first coil spring, the second coil spring has an outer peripheral surface and an inner peripheral surface that are defined by an outer diameter and an inner diameter, respectively,
the control member and the internal gear slidably contact with one of the outer peripheral surface and the inner peripheral surface of the second coil spring, respectively,
when the internal gear rotates in the opposite direction to the rotational direction of the drive shaft (SI), the second coil spring is tightened around the control member so as to increase a factional force between the corresponding peripheral surface of the second coil spring and the control member, so that the control member rotates in the opposite direction to the rotational direction of the drive shaft.

17. A torque transmission mechanism as in claim 12, wherein the coupling device includes an engaging mechanism between the control member and the internal gear.

18. A torque transmission mechanism as in any one of claims 1 and 12, wherein:
the controller comprises a switching device that is arranged and constructed to be switched between a torque accumulation mode and a torque releasing mode,
in the torque accumulation mode, the rotational torque of the drive shaft is accumulated in the torque accumulator but is not transmitted to the driven shaft, and
in the torque releasing mode, the accumulated torque in the torque accumulator is released to rotate the driven shaft.

19. A power tool as in claim 1, wherein the driven shaft comprises a spindle that is arranged and constructed to mount a tool bit for engaging fasteners.

20. A power tool comprising a torque transmission mechanism as in claim 4, and further including a motor, a housing that accommodates the motor, the handle arranged and constructed to be grasped by an operator, and a trigger arranged and constructed to be operable by the operator for starting and stopping the motor, wherein the lever and the trigger are disposed adjacent to each other, so that the operator can operate either the lever or the trigger while the operator grasps the handle.

21. A torque transmission mechanism, comprising:
a drive shaft,
a drive unit arranged and constructed to rotate the drive shaft,
a driven shaft, and
a first coil spring having a first portion and a second portion, wherein the drive shaft and the driven shaft are inserted into the first portion and the second portion, respectively, so that the first portion and the second portion of the first coil spring are tightened around the drive shaft and the driven shaft, respectively, as the drive shaft rotates, wherein:
when one end of the first coil spring rotates in a releasing direction, the tightened first coil spring is released to permit an idle rotation of the drive shaft relative to the first coil spring, and
the first coil spring is then tightened around the drive shaft that rotates idle, so that an inertia torque produced by the idle rotation of the drive shaft in addition to an output torque of the drive unit is transmitted the driven shaft.

22. A torque transmission mechanism as in claim 21, wherein:
the drive unit comprises an electric motor,
a planetary, gear mechanism is disposed between the electric motor and the drive shaft and includes a carrier and an internal gear,
the drive shaft is mounted on the carrier and rotates with the carrier when the rotation of the internal gear is stopped, and
the internal gear rotates in an opposite direction to the rotational direction of the drive shaft when a load applied to the driven shaft exceeds a predetermined range, so that the one end of the first coil spring is rotated to release the tightened state and to permit the idle rotation of the drive shaft, the rotation of the internal gear is then stopped, and the first coil spring is again tightened around the drive shaft and the driven shaft.

23. A torque transmission mechanism as in claim 22 further including a second coil spring coiled in an opposite direction to the coiling direction of the first coil spring and interposed between the one end of me first coil spring and the internal gear, wherein the internal gear is coupled to the one end of the first coil spring via the second coil spring, so that the one end of the first coil spring rotates in the opposite direction to the rotational direction of the drive shaft as the internal gear rotates in the opposite direction.

24. A torque transmission mechanism as in claim 22 further including a lock device manually operable to prevent the first coil spring from being tightened around the drive shaft and to permit the first coil spring to be tightened around the drive shaft.

25. A power tool comprising a torque transmission mechanism as in claim 21.

26. A torque transmission mechanism comprising:
a drive shaft,
a drive unit arranged and constructed to rotate the drive shaft in a first direction and a second direction opposite to the first direction,
a driven shaft and a rotary member disposed on opposite sides with each other with respect to the drive shaft and arranged on the same axis as the drive shaft,
a coil spring fitted on and extend over the rotary member, the drive shaft and the driven shaft, and
an intermediate shaft arranged and constructed to transmit rotation of the drive shaft to the driven shaft, wherein:
when the drive shaft rotates in the first direction, the coil spring is tightened around the drive shaft and the driven shaft, so that the driven shaft rotates with the drive shaft;
when the drive shaft rotates in the second direction, the coil spring is tightened around the drive shaft and the rotary member, so that the rotary member rotates with the drive shaft;
the drive shaft rotates idle when one end of the coil spring is rotated in a releasing direction to release the tightening of the coil spring around the drive shaft during the rotation of the drive shaft in either the first direction or the second direction, and
when the one end of the coil spring is rotated in the opposite direction to the releasing direction, the coil spring is again tightened around the drive shaft that rotates idle, so that an inertia torque produced by the idle rotation of the drive shaft in addition to an output torque of the drive unit is applied to the driven shaft.

27. A torque transmission mechanism as in claim 26 further including a lock device manually operable to prevent the coil spring from being tightened around the drive shaft and to permit the coil spring to be tightened around the drive shaft.

28. A power tool comprising a torque transmission mechanism as in claim 26.

29. A torque transmission mechanism comprising:
a drive shaft,
a drive unit arranged and constructed to rotate the drive shaft in a first direction and a second direction opposite to the first direction,
a driven shaft and a rotary member disposed on opposite sides with each other with respect to the drive shaft and arranged on the same axis as the drive shaft, and
a coil spring fitted on and extended over the rotary member, die drive shaft and the driven shaft; wherein
when the drive shaft rotates in the first direction, the coil spring is tightened around the drive shaft and the driven shaft, so that the driven shaft rotates with the drive shaft in the first direction, and
when the drive shaft rotates in the second direction, the coil spring is tightened around the drive shaft and the rotary shaft, so that the rotary shaft rotates with the drive shaft in the second direction.

* * * * *